(12) United States Patent
Iwase et al.

(10) Patent No.: US 6,871,243 B2
(45) Date of Patent: Mar. 22, 2005

(54) IMAGE PROCESSING SYSTEM THAT COMMUNICATES WITH A PORTABLE DEVICE HAVING USER INFORMATION

(75) Inventors: Akinori Iwase, Yokosuka (JP); Kazuhiro Ogura, Kawasaki (JP); Tatsuya Haraguchi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 450 days.

(21) Appl. No.: 09/749,550

(22) Filed: Dec. 28, 2000

(65) Prior Publication Data

US 2002/0097262 A1 Jul. 25, 2002

(51) Int. Cl.[7] .......................... G06F 13/00; G06F 13/14
(52) U.S. Cl. .............................. 710/62; 710/8; 710/14; 710/15; 710/16; 710/73; 709/225
(58) Field of Search ............................... 710/8, 14, 15, 710/16, 62, 73; 709/225

(56) References Cited

U.S. PATENT DOCUMENTS

| | | | | |
|---|---|---|---|---|
| 5,519,499 A | * | 5/1996 | Saito | 358/296 |
| 5,550,623 A | * | 8/1996 | Tomita et al. | 399/83 |
| 5,717,955 A | * | 2/1998 | Swinehart | 710/62 |
| 5,907,319 A | * | 5/1999 | Hashimoto et al. | 345/173 |
| 6,084,952 A | * | 7/2000 | Beerman et al. | 379/93.25 |
| 6,202,092 B1 | * | 3/2001 | Takimoto | 709/225 |
| 6,424,249 B1 | * | 7/2002 | Houvener | 340/5.82 |
| 6,530,083 B1 | * | 3/2003 | Liebenow | 725/46 |

FOREIGN PATENT DOCUMENTS

| | | | | |
|---|---|---|---|---|
| JP | 405221072 A | * | 8/1993 | ............ B41J/21/00 |
| JP | 8-307570 | | 11/1996 | |
| JP | 11-32154 | | 2/1999 | |

* cited by examiner

*Primary Examiner*—Rehana Perveen
(74) *Attorney, Agent, or Firm*—Foley & Lardner LLP

(57) ABSTRACT

User information is acquired from a portable device and setting information of the user is acquired from a server based on the user information from the portable device to customize settings for each user. As a result, a digital copying machine having a user interface which is set to be easily customized for a user is provided.

7 Claims, 20 Drawing Sheets

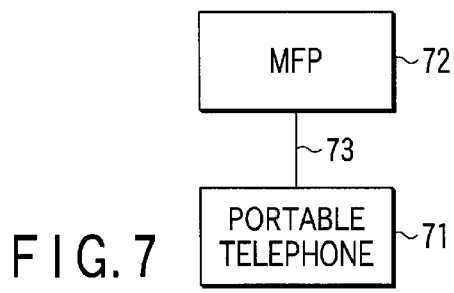
F I G. 7
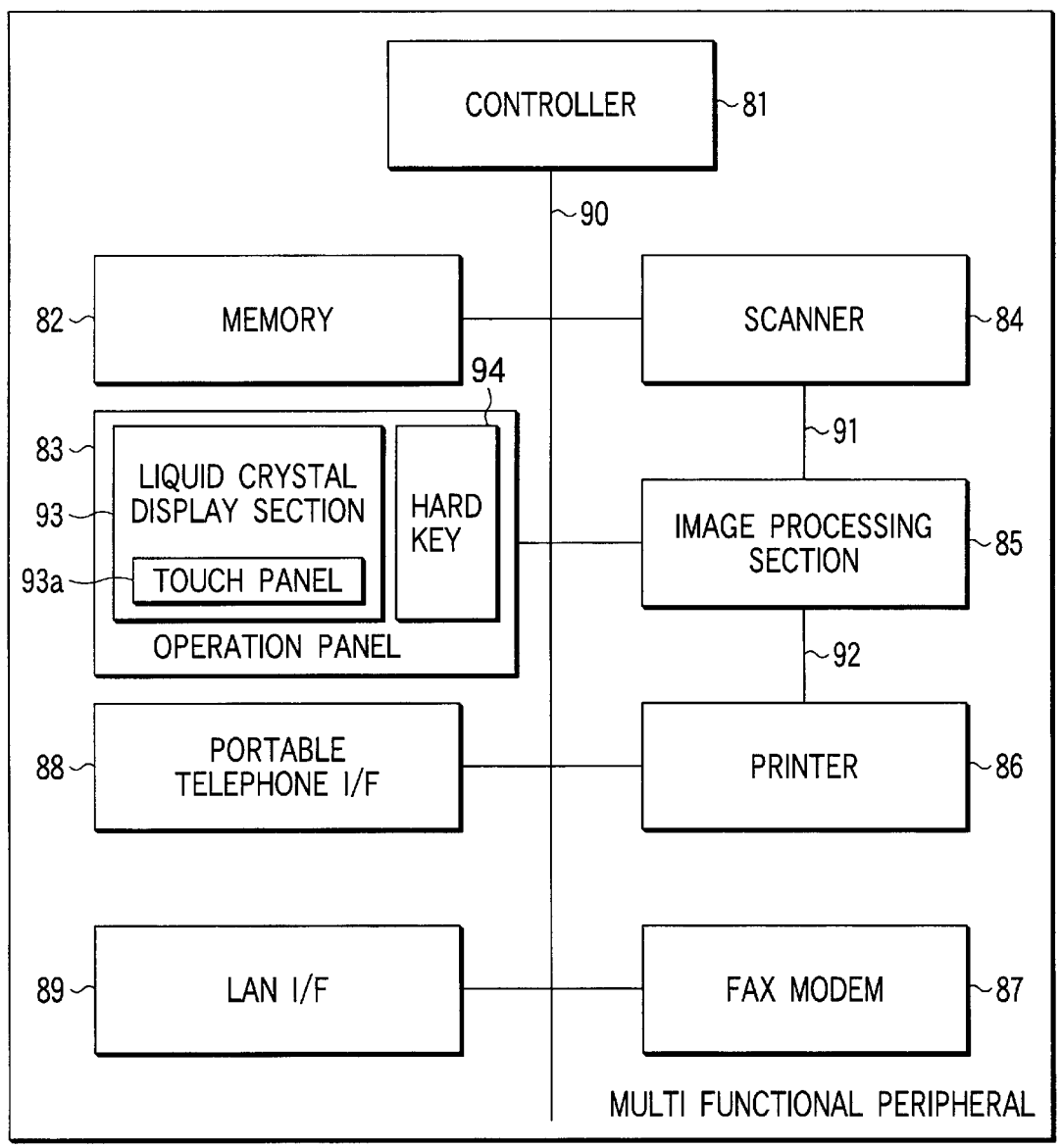
F I G. 8

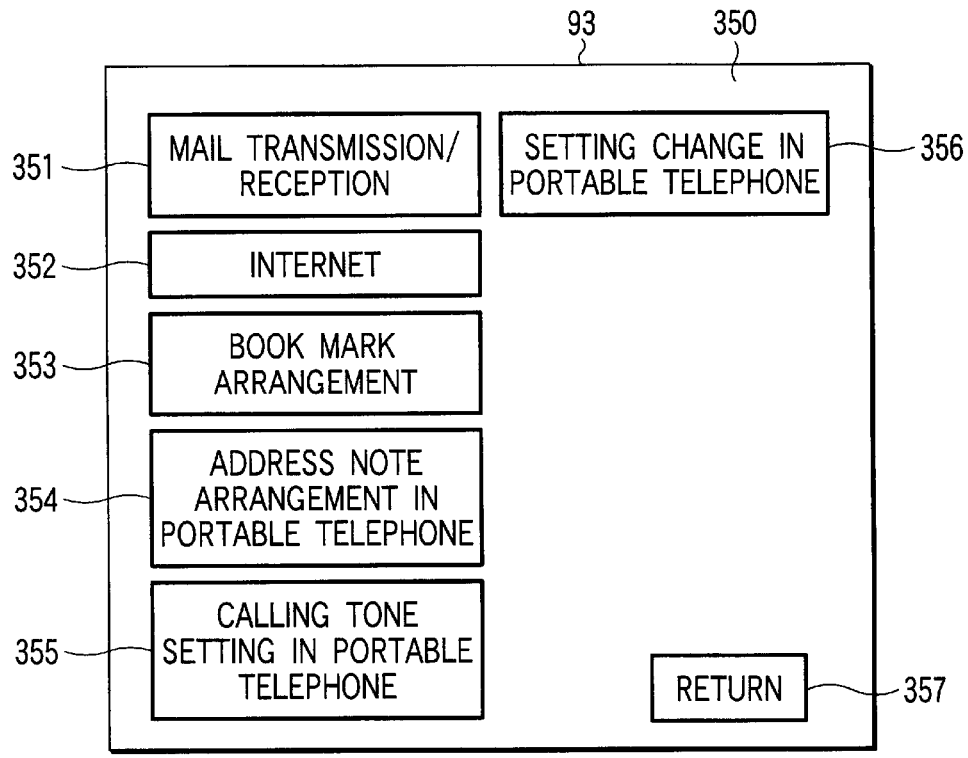
F I G. 32
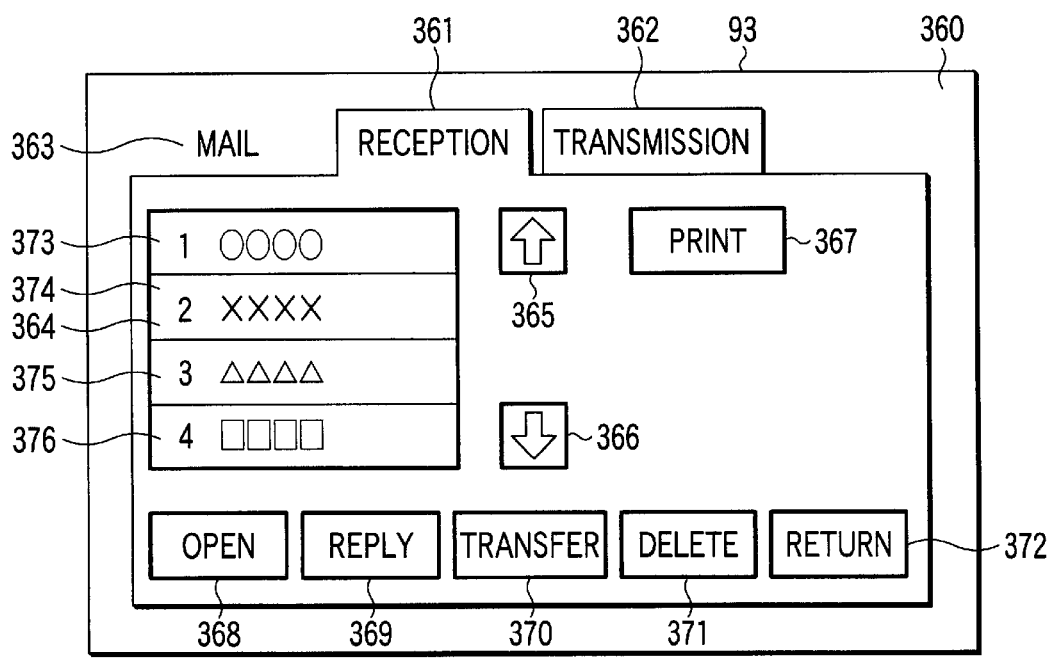
F I G. 33

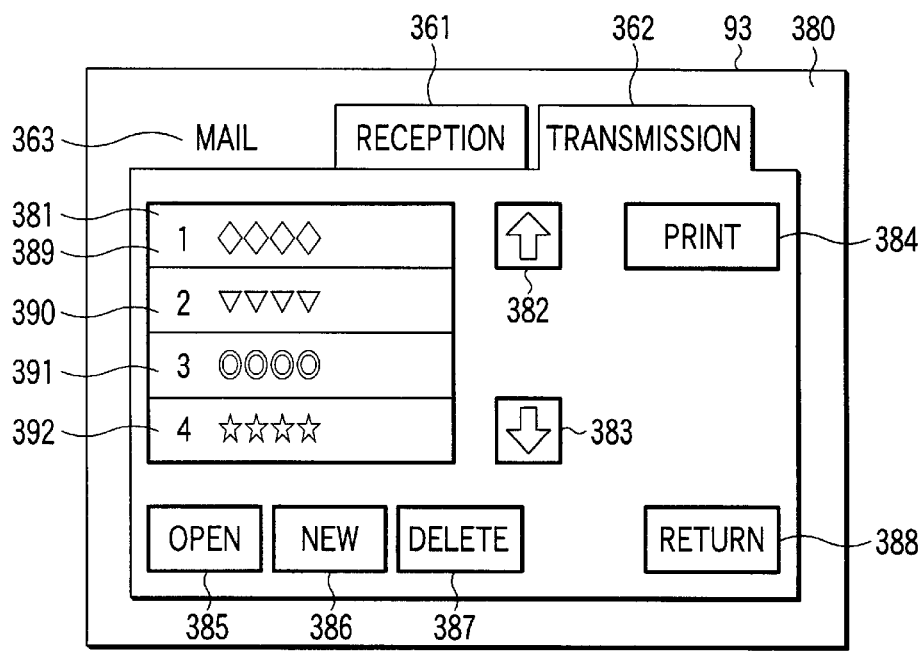
F I G. 34
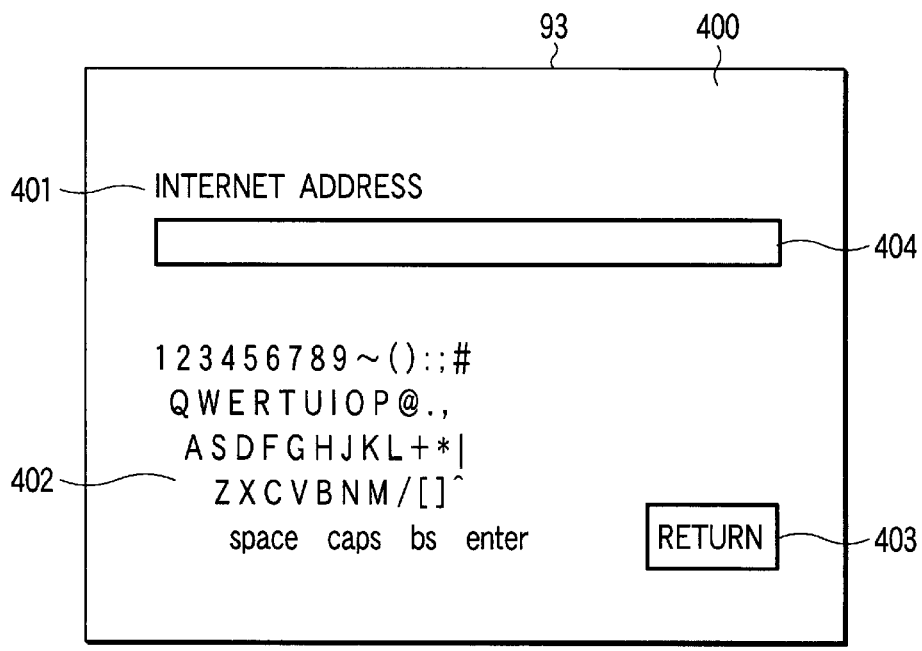
F I G. 35

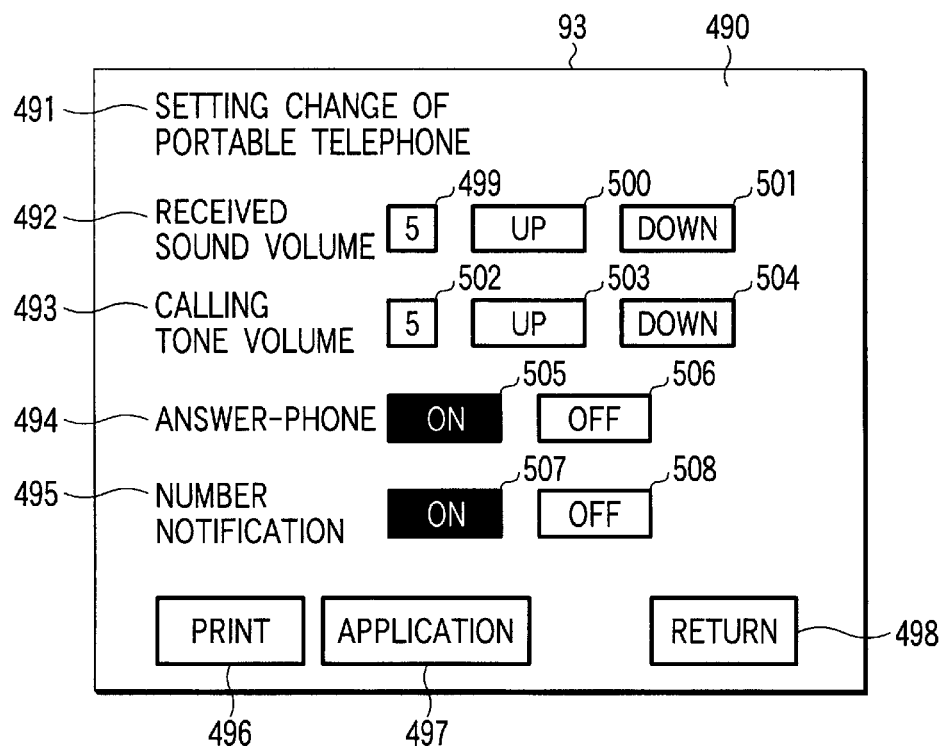
F I G. 40
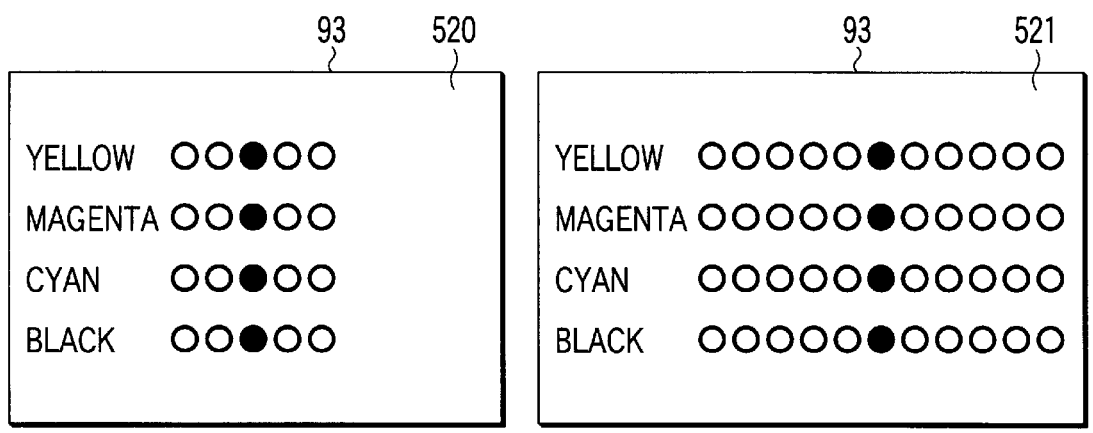
F I G. 41      F I G. 42

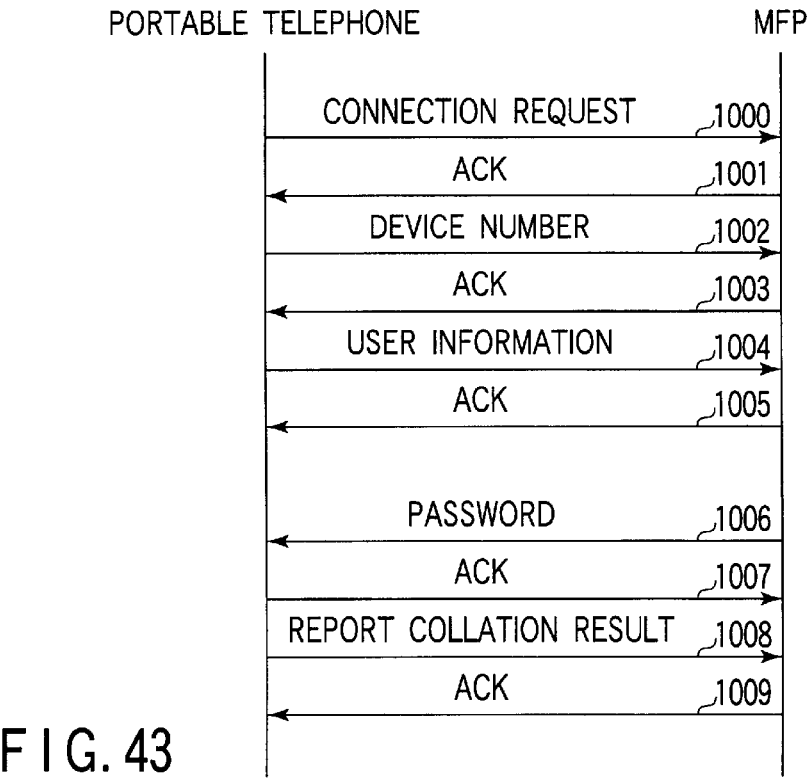
F I G. 43
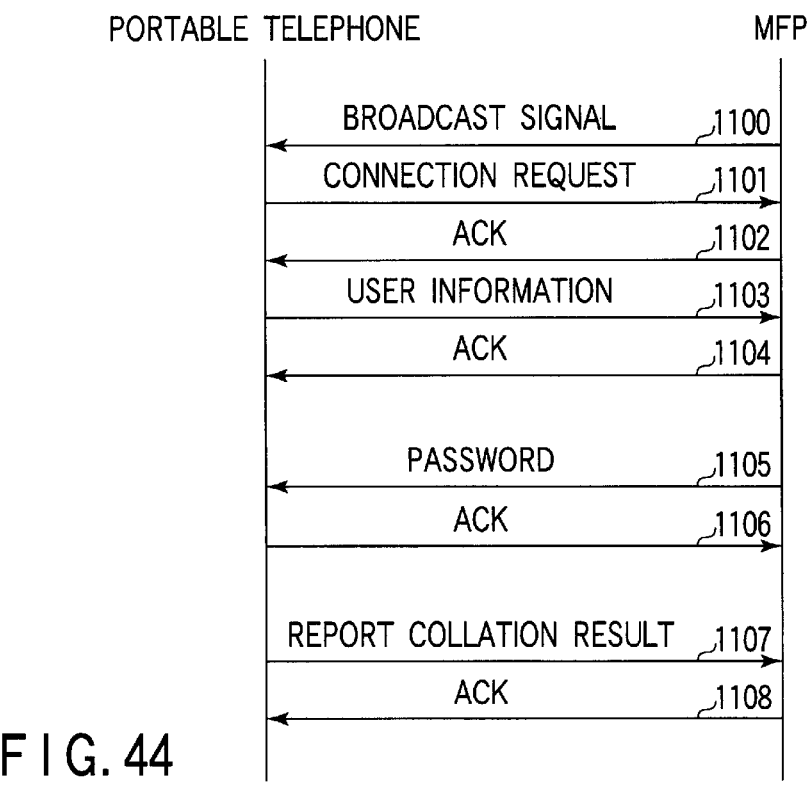
F I G. 44

IMAGE PROCESSING SYSTEM THAT COMMUNICATES WITH A PORTABLE DEVICE HAVING USER INFORMATION

BACKGROUND OF THE INVENTION

This invention relates to a multi functional peripheral using a portable telephone which is a portable network terminal now used and an operating method thereof.

Recently, portable devices such as portable telephones have been developed and are popularly used by a lot of users. The portable telephone is used as a portable network terminal to easily access information in any desired position and acquire information.

Most of multi functional peripherals each including a scanner and printer are designed to have multiple functions in recent years. Since a large number of functions are provided for the multi functional peripheral, the operation of the user becomes complicated. For example, when a multi functional peripheral having a double-face printing function, staple function and sort function is used, it is required for the user himself to set a double-face printing mode, staple mode and sort mode. Further, when a multi functional peripheral having a color printing function is used, it is required for the user himself to set color tone.

It is considered to store the setting contents for each user in the above multi functional peripheral having multiple functions in order to simplify the complicated operation of the user. For example, in Jpn. Pat. Appln. KOKAI Publication No. 8-307570, the technique for effecting an operation according to a menu screen registered for each user when the user operates the device by use of a touch panel as an operating section of the multi functional peripheral is disclosed. In this case, a screen corresponding to a user code input by the user is displayed on the display means of the multi functional peripheral. Therefore, the user can operate the device by use of the previously registered screen.

However, with the above technique, authentication of the user is made only by use of the input user code and the safety of the registered screen for each user is low. Further, the screen is effective only for a multi functional peripheral in which setting information for each user is registered. Therefore, even if setting information for each user is registered in a specific multi functional peripheral, there occurs a problem that the setting information cannot be used in another multi functional peripheral.

Further, in Jpn. Pat. Appln. KOKAI Publication No. 11-32154, the technique for connecting external devices such as a video camera and portable telephone to a digital image forming apparatus and operating the external devices by use of the digital image forming apparatus is disclosed. However, in Jpn. Pat. Appln. KOKAI Publication No. 11-32154, only the technique for operating the connected external devices by use of the digital image forming apparatus is disclosed. With the above technique, it is possible to operate the external devices connected to the digital image forming apparatus by use of the digital image forming apparatus, but the operability of the digital image forming apparatus cannot be enhanced.

BRIEF SUMMARY OF THE INVENTION

As described above, the conventional multi functional peripheral has a problem that the safety is low when setting information previously registered for each user is used. Accordingly, in order to solve the above problem, an object of this invention is to provide a multi functional peripheral in which setting information for each user can be easily and safely used and the operability of each user can be greatly enhanced.

Further, even if an external device is connected to the conventional multi functional peripheral, the external device is only operated on the multi functional peripheral side and it has a problem that the operability of the multi functional peripheral cannot be enhanced. Therefore, in order to solve the above problem, an object of this invention is to provide a multi functional peripheral to which an external device can be easily connected without fail and whose operability can be enhanced based on information acquired from the external device.

Further, the conventional multi functional peripheral has a problem that even if setting information for each user is previously registered, the setting information cannot be used in a multi functional peripheral other than the multi functional peripheral in which the setting information for each user is previously set. Therefore, in order to solve the above problem, an object of this invention is to provide a multi functional peripheral in which it does not take a long time and much labor to register setting information of each user and the operability of each user can be greatly enhanced.

There are a large number of types of multi functional peripherals and a large number of operating screens are provided depending on manufacturing companies and types of the devices. Therefore, the user can easily make various settings in a multi functional peripheral which he normally uses, but it becomes difficult for him to make various settings when the manufacturing company and the type of the device are changed. Therefore, an object of this invention is to provide a multi functional peripheral which permits setting information previously registered therein to be used in the most suitable state in an image processing apparatus of a different type and in which the operability of each user can be greatly enhanced. In this application, a digital copying machine is one example of a multifunctional peripheral.

In an embodiment, the present invention provides a digital copying machine including an image reading section configured to execute image reading processing, which converts an original image into image data; an image processing section configured to execute image processing with respect to the image data read by the image reading section or image data acquired from an external apparatus; an image forming section configured to execute image formation processing. which forms an image on an image formation medium; a first interface for transmitting/receiving information with respect to a portable device having user information; and a control section for acquiring the user information from the portable device via the first interface, acquiring setting information corresponding to the user indicated by the user information from a server having setting information stored therein for each user via the portable device, and making settings for the image reading section, the image processing section or the image forming section by use of the setting information acquired from the server via the portable device.

In an embodiment, the present invention provides a digital copying machine including an image reading section configured to execute image reading processing, which converts an original image into image data; an image processing section configured to execute image processing with respect to the image data read by the image reading section or image data acquired from an external apparatus; an image forming section configured to execute image formation processing, which forms an image on an image formation medium; a first interface for transmitting/receiving information with respect to a portable device having user information; a second interface for transmitting/receiving information with respect to a server having setting information stored therein for each user; and a control section for acquiring the user information from the portable device via the first interface, acquiring setting information corresponding to the user indicated by the user information from the server via the second interface, and making settings for the image reading section, the image processing section or the image forming section by use of the setting information acquired from the server via the second interface.

In an embodiment, the present invention provides a digital copying machine including an image reading section configured to execute image reading processing, which converts an original image into image data; an image processing section configured to execute image processing with respect to the image data read by the image reading section or image data acquired from an external apparatus; an image forming section configured to execute image formation processing, which forms an image on an image formation medium; a first interface for transmitting/receiving information with respect to a portable device having user information; and a control section for setting up connection with the portable device via the first interface when receiving a request of connection from the portable device, acquiring user information from the portable device to which the connection is set up via the first interface, acquiring setting information corresponding to the user indicated by the acquired user information from a server having setting information stored therein for each user via the portable device, and making settings for the image reading section, the image processing section or the image forming section by use of the acquired setting information.

In an embodiment, the present invention provides a digital copying machine including an image reading section configured to execute image reading processing, which converts an original image into image data; an image processing section configured to execute image processing with respect to the image data read by the image reading section or image data acquired from an external apparatus; an image forming section configured to execute image formation processing. which forms an image on an image formation medium; a first interface for transmitting/receiving information with respect to a portable device which has user information and can be connected to an Internet; and a control section, connected to the portable device via the first interface, for acquiring setting information of the user indicated by user information of the portable device from a server having setting information stored therein for each user and connectable thereto via the Internet by use of the portable device and making settings for the image reading section, the image processing section or the image forming section by use of the acquired setting information.

In an embodiment, the present invention provides an image processing system including a digital multifunction machine in which various settings can be made, and a server. The server includes a first data base for storing setting information for each of users; and a second data base for converting the setting information in accordance with types of various digital multifunction machines. The digital multifunction machine includes a first interface for transmitting/receiving information with respect to a portable device having user information; and a control section for acquiring setting information from the portable device, the setting information being obtained by converting setting information, which is stored in the first data base corresponding to the user information of the portable device connected via the first interface, in accordance with the second data base to match the multi function machine, and for making settings by use of the acquired setting information.

In an embodiment, the present invention provides an image processing system including a digital multifunction machine in which various settings can be made, and a server. The server includes a first data base for storing setting information for each of users; and a second data base for converting the setting information in accordance with types of various digital multifunction machines. The digital multifunction machine includes a first interface for transmitting/receiving information with respect to a portable device having user information; a second interface for transmitting/receiving information with respect to a server having setting information stored therein for each user; and a control section for acquiring user information from the portable device via the first interface, acquiring setting information corresponding to the user indicated by the acquired user information from the server via the second interface, the setting information being converted to match the digital multifunction machine in accordance with the second data base, and making settings by use of the acquired setting information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram for illustrating a third method for connection between a portable telephone and a multi functional peripheral;

FIG. 8 is a block diagram showing the schematic construction of a multi functional peripheral;

FIG. 32 is a view showing a display example of a setting screen displayed on the display section when various settings of the portable telephone are made on the multi functional peripheral side;

FIG. 33 is a view showing a display example of an operation screen for mail reception of the portable telephone displayed on the display section of the multi functional peripheral;

FIG. 34 is a view showing a display example of an operation screen for mail transmission of the portable telephone displayed on the display section of the multi functional peripheral;

FIG. 35 is a view showing a display example of an operation screen displayed on the display section when the portable telephone is connected to Internet by use of the multi functional peripheral;

FIG. 40 is a view showing a display example of a setting changing screen displayed on the display section of the multi functional peripheral when setting of the portable telephone is changed by use of the multi functional peripheral;

FIG. 41 is a view showing a display example of an adjusting screen displayed on the display section of the multi functional peripheral when color adjustment is made by use of an A-type multi functional peripheral;

FIG. 42 is a view showing a display example of an adjusting screen displayed on the display section of the multi functional peripheral when color adjustment is made by use of a B-type multi functional peripheral;

FIG. 43 is an event diagram for illustrating transmission/reception of information until connection between the multi functional peripheral and the portable telephone is set up by the first connection method;

FIG. 44 is an event diagram for illustrating transmission/reception of information until connection between the multi functional peripheral and the portable telephone is set up by the second connection method;

DETAILED DESCRIPTION OF THE INVENTION

There will now be described embodiments of this invention with reference to the accompanying drawings.

A multi functional peripheral (MFP) used as an mage processing apparatus of this invention includes a digital image forming device and digital image reading device. The multi functional peripheral has a copy function, printing function, scanner function, FAX function and the like. Since the multi functional peripheral has a lot of functions, it is called a multifunctional device.

A portable device used by the above multi functional peripheral is a portable device having individual information and communicating function. As the above portable device, any type of device is sufficient if it has individual information and communicating function, but in this embodiment, a case wherein a portable device which can be connected to Internet is used is explained. The same operation as is explained below can be effected if a device other than the portable telephone is used as the portable device.

A server used by the multi functional peripheral includes a personal computer (PC) or the like having a function of being connected to Internet, for example. In the server, operation-setting contents (user setting) for the multi functional peripheral previously set by the user are recorded. Plural types of multi functional peripherals are manufactured by a plurality of manufacturing companies. Therefore, various operating methods are provided depending on the multi functional peripherals. The multi functional peripheral used as the image processing apparatus of this invention fetches the operation-setting contents previously set by the user from the server.

In this embodiment, a case wherein an image processing system includes the above multi functional peripheral, portable device and server is explained. When the multi functional peripheral is used in the image processing system, the user causes the multi functional peripheral to fetch the user setting information previously set from the server by operating the portable device and uses the same.

Figure 1:
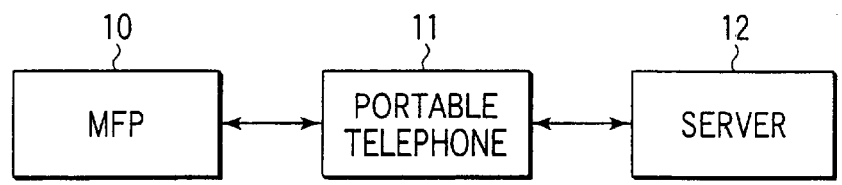
FIG. 1 is a diagram showing a first example of the construction of an image processing system according to an image processing apparatus of this invention.

FIG. 1 is a diagram showing a first example of the construction of the image processing system including a multi functional peripheral 10, portable telephone 11 and server 12. In FIG. 1, the connection relation of the portable telephone 11 and server 12 with respect to the multi functional peripheral 10 is schematically shown.

The multi functional peripheral 10 has a communication function with the portable telephone 11. Also, the server 12 has a communication function with the portable telephone 11. Various connecting systems are considered for connection between the multi functional peripheral 10 and portable telephone 11. Various connection methods, for example, Bluetooth which is a radio communication technology for the portable information device, IrDA (Infrared Data Association) for making data communication for short distance by use of infrared, wiring for directly connecting both sides by use of a cable and the like are considered. In this example, a case wherein they are connected by use of Bluetooth is explained, but the same operation as that when they are connected by use of Bluetooth can be realized when they are connected by use of IrDA.

The portable telephone 11 has a function of radio communication by Bluetooth as short-distance information communication. The portable telephone 11 has a function of connection to the public communication line as a general portable telephone. The portable telephone 11 has a communication function of making normal communication by use of the function of connection to the public communication line and an IP connection function of making IP connection.

The portable telephone 11 is connected to Internet by use of the IP connection function and can perform packet communication on Internet. Therefore, the portable telephone 11 and server 12 can be connected via Internet.

With the above construction, the multi functional peripheral 10 acquires information from the server 12 which is Internet-connected via the portable telephone 11 in a case where the multi functional peripheral 10 receives information from the server 12. Likewise, in a case where the server 12 receives information from the multi functional peripheral 10, the server 12 acquires information from the multi functional peripheral 10 via the portable telephone 11 which is connected to Internet.

Figure 2:
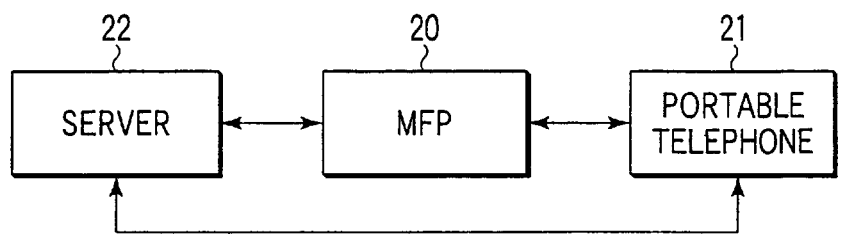
FIG. 2 is a diagram showing a second example of the construction of the image processing system.

FIG. 2 is a diagram showing a second example of the construction of the image processing system. In FIG. 2, the connection relation of a portable telephone 21 and server 22 with respect to a multi functional peripheral 20 is schematically shown.

Like the first example of the construction, in the second example of the construction, various connecting systems for connection between the multi functional peripheral 20 and portable telephone 21, for example, Bluetooth, IrDA, connection by use of a cable and the like are considered. Also, in the second example of the construction, like the first example of the construction, it is assumed that the multi functional peripheral 20 and portable telephone 21 are connected via Bluetooth.

Like the first example of the construction, the portable telephone 21 has a function of connection to the public communication line in addition to the communication function by use of Bluetooth. The portable telephone 21 has an IP connection function of IP connection and a conversation function of using the same as a telephone by the function of connection to the public communication line.

The multi functional peripheral 20 has a function of connection to the public communication line for facsimile communication. Further, the multi functional peripheral 20 has a function of Internet connection by use of the function of connection to the public communication line. The multi functional peripheral 20 is connected to the server 22 via Internet by the function of Internet connection.

The server 22 has a function of connection to Internet. Therefore, the server 22 is connected to the multi functional peripheral 20 and portable telephone 21 via Internet.

In the case of the second example of the construction, information for recognizing user information is transmitted or received between the portable telephone 21 and the multi functional peripheral 20 or between the portable telephone 21 and the server 22. Further, information from the server 22 is transmitted directly to the multi functional peripheral 20. Information from the multi functional peripheral 20 is transmitted directly to the server 22.

Figure 3:
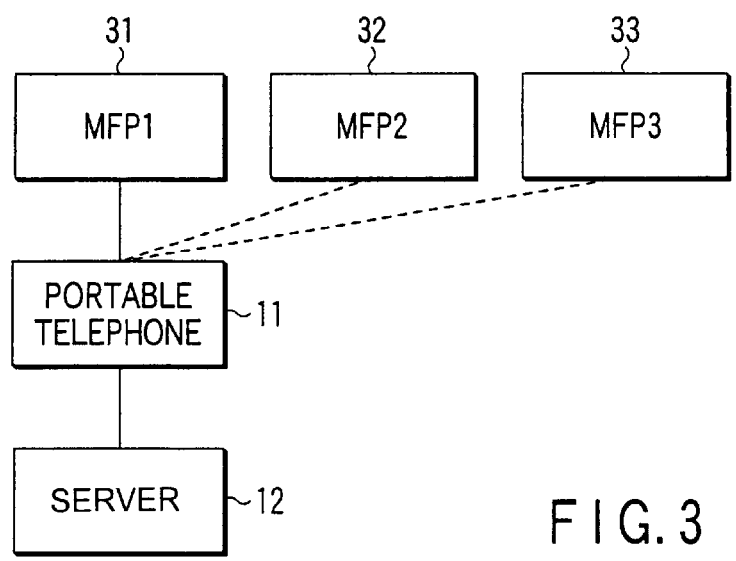
FIG. 3 is a diagram showing a third example of the construction of the image processing system.

FIG. 3 is a diagram showing a third example of the construction of the image processing system. In FIG. 3, a state wherein a plurality of multi functional peripherals 31, 32, 33, . . . which are connected as shown in the first example of the construction in FIG. 1 are provided is schematically shown.

That is, a portable telephone 11 is selectively connected to one of the multi functional peripherals 31, 32, 33, . . . A server 12 is connected to the portable telephone 11 by the IP connection using the public communication line.

In the third example of the construction, a plurality of multi functional peripherals 31, 32, 33, . . . are provided and the portable telephone 11 is connected to the multi functional peripheral 31. In this case, the connection relation shown in the first example of the construction is set up between the multi functional peripheral 31, server 12 and portable telephone 11. Likewise, if the portable telephone 11 is connected to the multi functional peripheral 32 or 33 by use of Bluetooth, the connection relation shown in the first example of the construction is set up.

Figure 4:
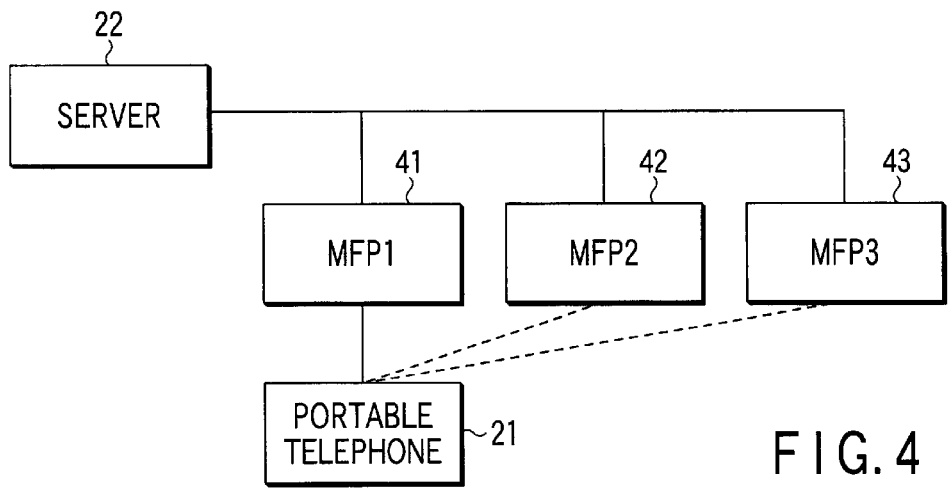
FIG. 4 is a diagram showing a fourth example of the construction of the image processing system.

FIG. 4 is a diagram showing a fourth example of the construction of the image processing system. In FIG. 4, a state wherein a plurality of multi functional peripherals 41, 42, 43, . . . which are connected as shown in the second example of the construction in FIG. 2 are arranged is schematically shown.

That is, the server 22 is selectively connected to one of the multi functional peripherals 41, 42, 43, . . . via Internet using the public communication line or by use of LAN. Further, the portable telephone 21 is selectively connected to one of the multi functional peripherals 41, 42, 43, . . . by use of Bluetooth.

In the example shown in FIG. 4, the portable telephone 21 is connected to the multi functional peripheral 41 by use of Bluetooth. In this case, the connection relation shown in the second example of the construction is set up between the multi functional peripheral 41, server 22 and portable telephone 21. Likewise, if the portable telephone 21 is connected to the multi functional peripheral 42, 43, . . . by use of Bluetooth, the connection relation shown in the second example of the construction is set up.

In a case where a plurality of multi functional peripherals are provided as shown in the examples of the constructions as shown in FIGS. 3 and 4, the multi functional peripherals may be products made by different manufacturing companies or may be of different types.

Next, a connection method for selecting a specified one of multi functional peripherals as a destination of connection of the portable telephone and connecting the portable telephone thereto when a plurality of multi functional peripherals are provided as shown in the third and fourth examples of the constructions is schematically explained.

In the third and fourth examples of the constructions, a plurality of multi functional peripherals are provided and the portable telephones 11, 21 are selectively connected to the multi functional peripherals by use of Bluetooth. At this time, the portable telephone is required to make one-to-one connection with a specified one of a plurality of multi functional peripherals.

When a plurality of multi functional peripherals are provided, various connection methods for selecting a specified one of the multi functional peripherals on the portable telephone side and connecting the portable telephone thereto are considered. In this example, three connection methods are schematically explained.

Figure 5:
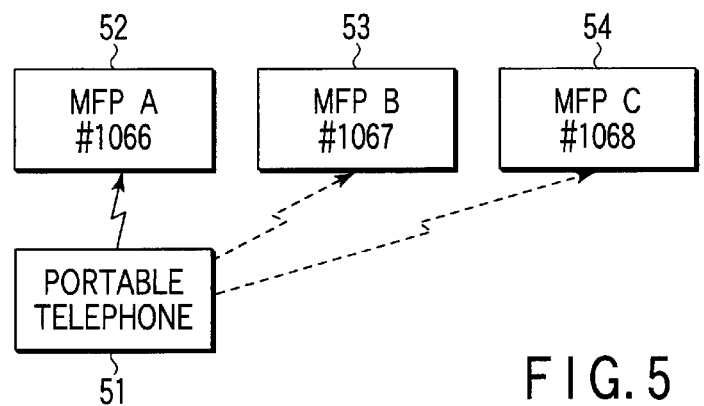
FIG. 5 is a diagram for illustrating a first method for connection between a portable telephone and a multi functional peripheral.

First, the first connection method is explained with reference to FIG. 5. FIG. 5 is a diagram for illustrating a method for causing a portable telephone 51 to select one of three multi functional peripherals which is to be used and make connection therewith.

In the example shown in FIG. 5, it is assumed that numbers are previously assigned to the three multi functional peripherals. A number "1066" is assigned to a multi functional peripheral A 52, a number "1067", is assigned to a multi functional peripheral B 53, and a number "1068" is assigned to a multi functional peripheral C 54.

When the multi functional peripheral A 52 is selected in the example shown in FIG. 5, the user inputs the number "1066" assigned to the multi functional peripheral A 52 into the portable telephone 51. Thus, the portable telephone 51 transmits a connection request for the multi functional peripheral with the number "1066". If an answer for permitting connection is returned from the multi functional peripheral, the connection with the multi functional peripheral A 52 is set up.

That is, in the first connection method, a multi functional peripheral to be connected is selected by transmitting a signal which specifies the multi functional peripheral of connection destination from the portable telephone.

Figure 6:
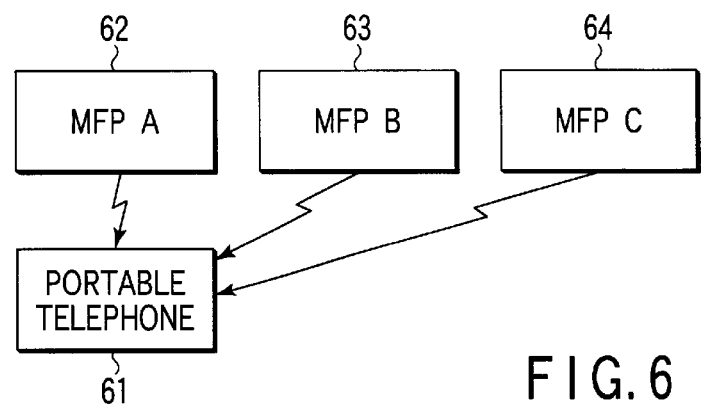
FIG. 6 is a diagram for illustrating a second method for connection between a portable telephone and a multi functional peripheral.

Next, the second connection method is explained with reference to FIG. 6. FIG. 6 is a diagram for illustrating a case wherein a portable telephone 61 which has received information transmitted from three multi functional peripherals selects one of the multi functional peripherals which is to be used and makes connection therewith.

In this case, multi functional peripherals A 62, B 63, C 64 transmit broadcast signals. Codes for identifying the respective devices are contained in the broadcast signals from the multi functional peripherals.

In the example shown in FIG. 6, a code "A" is attached to the multi functional peripheral A 62, a code "B" is attached to the multi functional peripheral B 63, and a code "C" is attached to the multi functional peripheral C 64.

When the portable telephone 61 receives the broadcast signals transmitted from the multi functional peripherals A, B, C, the portable telephone recognizes that the three multi functional peripherals A, B, C are available. Therefore, the portable telephone 61 notifies the user that the multi functional peripherals A 62, B 63, C 64 can be used by use of the display section, for example. The user selects one of the multi functional peripherals to be connected from the multi functional peripherals which can be used. If the multi functional peripheral to be connected is selected by the user, the portable telephone 61 effects the process for connection with the selected multi functional peripheral to be connected.

That is, in the second connection method, the portable telephone recognizes multi functional peripherals which are available based on the signals transmitted from the multi functional peripherals and the user selects one of the multi functional peripherals to be connected from the multi functional peripherals which are recognized as being usable.

Next, a third connection method is explained with reference to FIG. 7. FIG. 7 is a diagram for illustrating a method for selecting a multi functional peripheral 72 by connecting a portable telephone 71 to the multi functional peripheral 72 by use of a cable 73. In this case, the multi functional peripheral 72 is selected by causing the user to connect the portable telephone 71 to the multi functional peripheral 72 by use of the cable 73. As a result, only the connection of the portable telephone 71 with the multi functional peripheral 72 is set up.

Next, the whole construction of the multi functional peripheral is explained.

FIG. 8 is a block diagram showing an example of the schematic construction of a multi functional peripheral (10, 20, 31 t 33, 41 to 43, 52 to 54, 61 to 63, 72). As shown in FIG. 8, the multi functional peripheral includes a controller 81, memory 82, operation panel 83, scanner 84, image processing section 85, printer 86, FAX modem 87, portable telephone interface 88, LAN interface 89 and the like.

The above constituents 81 to 89 are connected via a bus 90. Necessary data is transmitted/received with respect to the above constituents via the bus 90. Further, the scanner 84 and image processing section 85 are connected via an image data bus 91. Therefore, image data read by the scanner 84 is transmitted to the image processing section 85 at high speed via the image data bus 91. Also, the image processing section 85 and printer 86 are connected via an image data bus 92. Image data processed in the image processing section 85 is transmitted to the printer 86 at high speed via the image data bus 92.

The controller 81 controls the whole operation of the multi functional peripheral. The controller 81 is constructed by a CPU (Central Processing Unit) and the like. The controller 81 is operated according to a previously stored control program and control data.

The memory 82 includes a ROM in which a control program and control data are stored, an NVM in which variable setting values are stored, and a RAM for temporarily storing information. When the controller 81 is operated, the memory 82 is used to temporarily store various information items and temporarily store part of data.

The operation panel 83 includes a display section 93 and hard key pad 94. The display section 93 is constructed by a liquid crystal display device (LCD) containing a touch panel 93a. On the display section 93, the operation state of the multi functional peripheral and the operation guidance for the user are displayed. Further, on the display section 93, touch keys are displayed by the touch panel 93a and operated by the user. The hard key pad 94 is constructed by a ten-key pad, a start key for specifying the start of the copying operation and the like.

The scanner 84 reads an original. The saner 84 optically scans the original to convert the image of the original into image data. The image processing section 85 processes image data. The image processing section 85 effects various processes for image data. The printer 86 prints image data on paper. Various types of printers such as an electrophotographic type or ink jet type are considered as the printer 86, but in this embodiment, an electrophotographic type printer is used.

The FAX modem 87 is connected to the public communication line to effect the data transmission/reception process with respect to an external device. The FAX modem 87 has a facsimile function and a function of connection to Internet. By use of the facsimile function, image data read by the scanner 84 is transmitted as facsimile data via the public communication line and FAX data received from the external device is printed on paper by the printer 86. Further, by use of the function of connection to Internet, it is connected to Internet via the public communication line to transmit/receive data with respect to an external device on Internet.

The portable telephone interface 88 is an interface for connection with the portable telephone and the multi functional peripheral effects data transmission/reception with respect to the portable telephone via the interface. The portable telephone interface 88 is so constructed as to cope with the connection methods, for example, Bluetooth, IrDA, connection by use of the cable and the like. For example, when Bluetooth is used as a system for connection with the portable telephone, a module for Bluetooth is provided. If IrDA is used as the connection system, an infrared communication port is provided. Further, the connection system by use of a cable is used, a terminal for connection with the cable is provided.

When the multi functional peripheral is connected to a LAN (Local Area Network), the LAN interface 89 effects data transmission/reception with respect to another device on the LAN.

Next, the whole construction of the server is explained.

Figure 9:
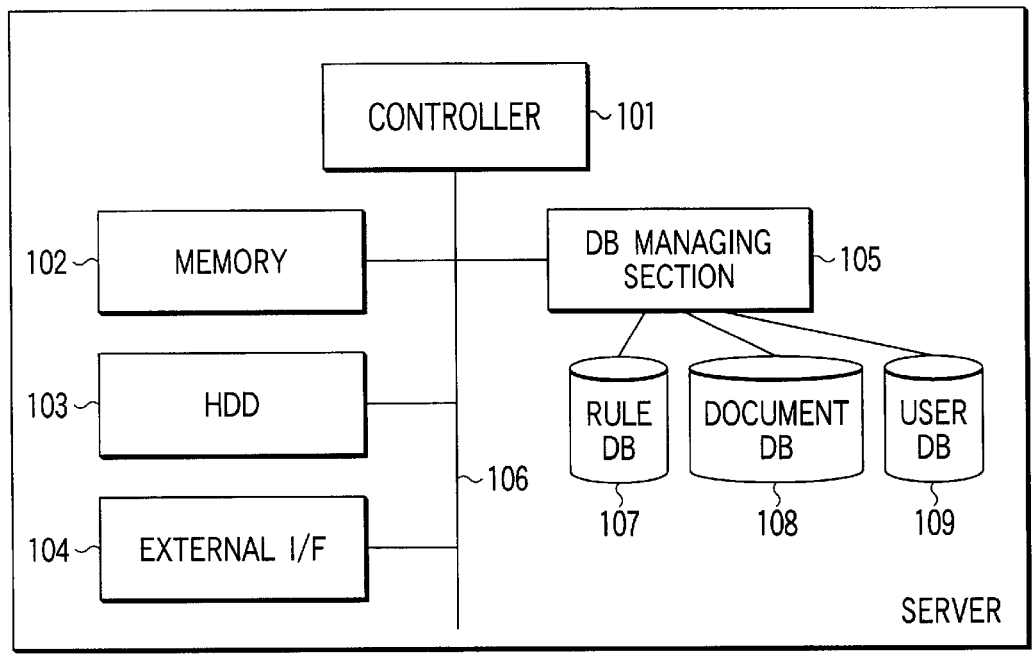
FIG. 9 is a block diagram showing the schematic construction of a server.

FIG. 9 is a block diagram showing the schematic construction of the server (12, 22). As shown in FIG. 9, the server includes a controller 101, memory 102, hard disk drive (HDD) 103, external interface 104, DB managing section 105 and the like. The above constituents are connected via a bus 106. Necessary data is transmitted or received between the above constituents via the bus 106.

The controller 101 includes a CPU or the like. The controller 101 controls the whole operation of a server 100. The controller 101 is operated according to a previously stored control program and control data.

The memory 102 includes a ROM in which a control program and control data are stored, an NVM in which variable setting values are stored, and a RAM for temporarily storing information. When the controller 101 is operated, the memory 102 is used to temporarily store various information items and temporarily store part of data.

The HDD 103 stores various data items. Various data items for operating the server 100 or setting information items for the user are stored in the HDD 103.

The external interface 104 is used to transfer data with respect to the portable telephone or the exterior such as the network. In this embodiment, the external interface is constructed by a modem connected to Internet or a LAN interface for LAN connection.

The DB managing section 105 manages various data bases. The data bases are stored in the hard disk, optical disk, magneto-optical disk or the like. In this embodiment, three data bases including a rule DB 107, document DB 108 and user DB 109 are used. In this case, the DB managing section 105 manages the rule DB 107, document DB 108 and user DB 109.

Various type-dependent data items and correlation rules thereof are stored in the rule DB 107. For example, setting of the density adjustment is five levels in a certain multi functional peripheral, but it may be eleven levels in another multi functional peripheral. In this case, when the user who makes the density adjustment to his satisfaction in the five-level type uses a type having the density adjustment of eleven levels, one of the density levels which is to be mapped is previously stored as a rule. Therefore, data depending on the type and the correlation conversion table between them are stored in the rule DB 107. Data stored in the rule DB 107 is described later.

A large number of documents are stored in the document DB 108. A larger number of documents which are often used by the user are stored. Particularly, a large number of document images fetched from the multi functional peripheral and a large number of documents to be printed by the multi functional peripheral are stored.

Various setting data items previously set by the user and data items such as user information are stored in the user DB 109. When setting of the user is assigned in the multi functional peripheral, data displayed by use of the user DB 107 and rule DB 108 is created to provide almost the same display in the different type and set the printing result similar to that obtained by using the original type.

Next, the construction of the portable telephone is explained.

Figure 10:
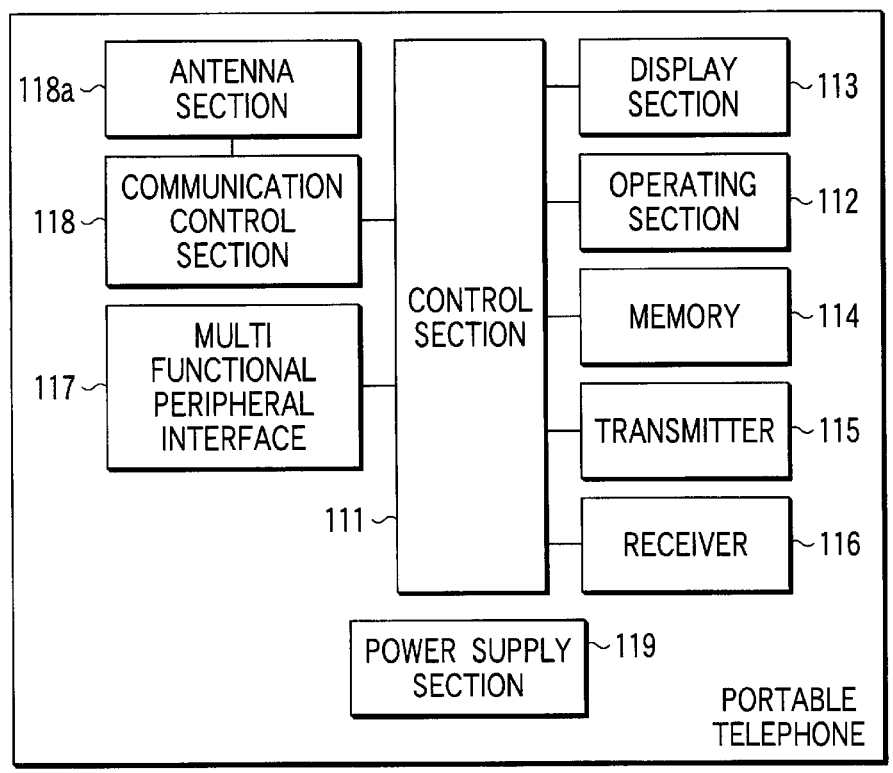
FIG. 10 is a block diagram showing the schematic construction of a portable telephone.

FIG. 10 is a block diagram schematically showing the whole construction of the portable telephone (11, 21, 51, 61, 71). As shown in FIG. 10, the portable telephone includes a control circuit 111, operating section 112, display section 113, memory 114, transmitting section 115, receiving section 116, multi functional peripheral interface 117, communication control circuit 118, power supply 119 and the like.

The control circuit 111 controls the whole portion of the portable telephone. The control circuit includes a CPU or the like. The memory 114 stores various information items such as a control program and ID number (authentication number). The operating section 112 includes a ten-key pad and various buttons for effecting various operations. By use of the operating section 112, inputting of numerals such as a telephone number, selection of a mode and various settings are made. The display section 113 is constructed by a liquid crystal display device to display various operation guidance items.

The transmitting section 115 has a microphone or the like to convert a voice generated by the user to voice data and output the same when it is used in the portable telephone. The receiving section 116 has a speaker or the like to reproduce voice data supplied from another device and received thereto and output the voice data from the speaker.

The multi functional peripheral interface 117 is an interface for connection with a multi functional peripheral. The multi functional peripheral interface 117 is constructed according to the system of connection with the multi functional peripheral. For example, if it is connected to the multi functional peripheral by use of Bluetooth, the multi functional peripheral interface 117 is constructed by a module for making short-distance radio communication by use of Bluetooth.

The communication control circuit 118 includes a modulation/demodulation circuit (transmission/reception circuit) for connection with the public communication line. An antenna section 118a is connected to the communication control circuit 118. The communication control circuit 118 transmits or receives radio waves via the antenna section 118a. When the communication control circuit 118 receives radio waves via the antenna section 118a, it demodulates received data and supplies the data to the control circuit 111. When the communication control circuit 118 transmits transmission data from the control circuit 111, the communication control circuit 118 transmits the transmission data in the form of radio waves from the antenna section 118a. Further, the communication control circuit 118 has a communication control function and IP connection function when it is connected to the public communication line. The communication control function is a function of controlling communication when conversation is made between the portable telephone and another telephone via the public communication line. The IP connection function is a function of controlling communication when the portable telephone is connected to the network via the public communication line to transmit/receive data.

The power supply 119 supplies the power supply voltage to the control circuit 111, operating section 112, display section 113, memory 114, transmitting section 115, receiving section 116, multi functional peripheral interface 117 and communication control circuit 118.

Next, the first connection method explained with reference to FIG. 5 is explained by using a display example of the portable telephone 51 shown in FIGS. 11, 12, 13, 14.

Figure 11:
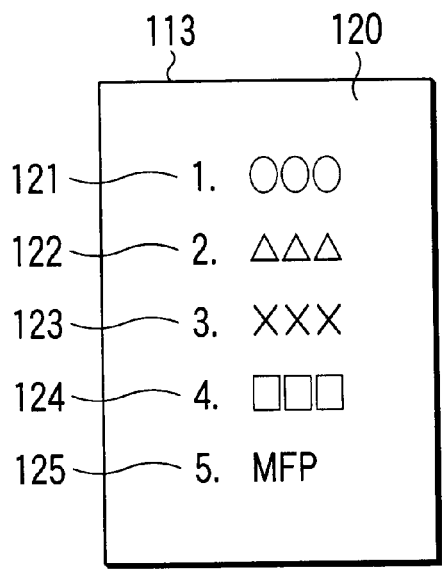
FIG. 11 is a view showing a display example displayed on a display section of the portable telephone when it is connected by use of the first connection method.

FIG. 11 shows an example in which a menu screen 120 is displayed on the display section 113 of the portable telephone 51. The menu screen 120 is displayed by operating the operating section 112 of the portable telephone 51. Five selection items are displayed on the menu screen 120. As the five selection items, "1.○○○" 121, "2.△△△" 122, "3.X X X" 123, "4.□□□" 124 and "5.MFP" 125 are displayed.

If the operating section 112 is operated to select "5.MFP" 125 on the menu screen 120, the control section 111 is set into a connection mode for connection with the multi functional peripheral. When the connection mode for connection with the multi functional peripheral is set, a multi functional peripheral selection screen 130 shown in FIG. 12 is displayed on the display section 113.

On the multi functional peripheral selection screen 130, one multi functional peripheral to be connected is selected from a plurality of multi functional peripherals. Further, in a case where only one multi functional peripheral is provided, the multi functional peripheral selection screen 130 is displayed for confirmation.

On the multi functional peripheral selection screen 130, an operation guiding section 131 on which the operation guidance is displayed, an input box 132, OK box 133 and return box 134 are displayed. On the operation guiding section 131, the operation guidance for the user is displayed. On the operation guiding section 131, the operation guidance is displayed. On the input box 132, a number input by the operating section 112 is displayed. The OK box 133 is selected when the number displayed on the input box 132 is correct. The return box 134 is selected when the screen is returned to the preceding screen (menu screen 120).

Figure 12:
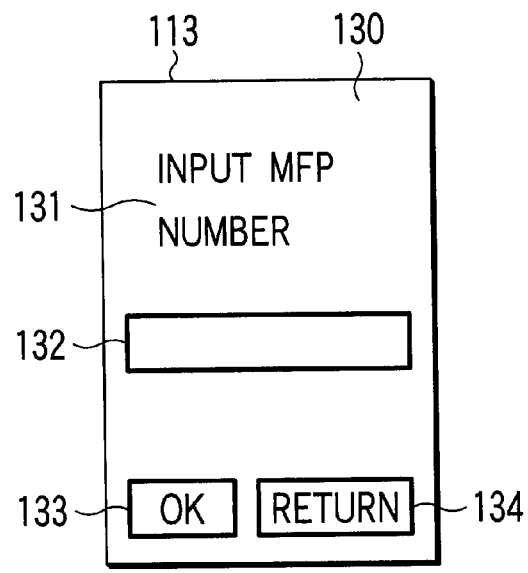
FIG. 12 is a view showing a display example displayed on the display section of the portable telephone when it is connected by use of the first connection method.

In an example shown in FIG. 12, the guidance "INPUT MFP NUMBER" is displayed on the operation guiding section 131 so as to permit the user to specify the multi functional peripheral. The user inputs the number of a multi functional peripheral which he wants to use according to the operation guidance by use of the operating section 112. Then, the number input by the user is displayed on the input box 132.

As shown in FIG. 5, for example, when the multi functional peripherals A 52, B 53, C 54 to which the numbers "1066", "1067", "1068" are attached are provided, the user inputs the number of the multi functional peripheral to be selected from the three numbers of "1066", "1067", "1068".

In this case, if the multi functional peripheral A 52 is selected, the user inputs "1066" by use of the operating section 112. Then, "1066", is displayed on the input box 132. If the number displayed on the input box 132 is correct, the user selects the OK box 133 by use of the operating section 112. If the user wants to return the display screen to the menu screen 120 from the state in which the multi functional peripheral display selection screen 130 is displayed, the user selects the return box 134 by use of the operating section 112.

Figure 13:
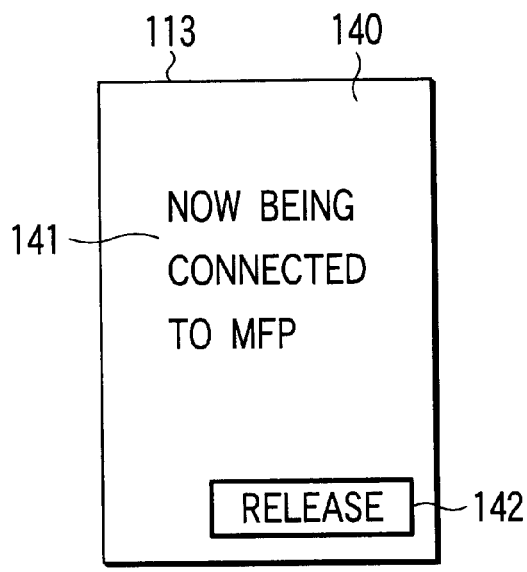
FIG. 13 is a view showing a display example displayed on the display section of the portable telephone when it is connected by use of the first connection method.

When the number is input to the input box 132 and the OK box 133 is selected, the control section 111 starts the process for connection with the multi functional peripheral A 52. At this time, the control section 111 displays a guide screen 140 which indicates that it is now in process for connection with the multi functional peripheral A 52 on the display section 113 as shown in FIG. 13. On the guide screen 140, a state guiding section 141 and release box 142 are displayed. The state guiding section 141 guides and displays the present state of the portable telephone 51. The release box 142 is selected when the user cancels the connection process. When the release box 142 is specified (depressed or touched), the control section 111 releases the process for connection with the multi functional peripheral.

In the display example shown in FIG. 13, the guidance "NOW BEING CONNECTED TO MFP" indicating that the connection process with multi functional peripheral (MFP) is being effected is displayed on the state guiding section 141. In this case, the release box 142 of the guide screen 140 is not specified and connection with the multi functional peripheral A 52 is set up. Then, a guide screen 150 indicating a state in which connection between the multi functional peripheral A 52 and the portable telephone 51 is set up as shown in FIG. 14 is displayed on the display section 113.

Figure 14:
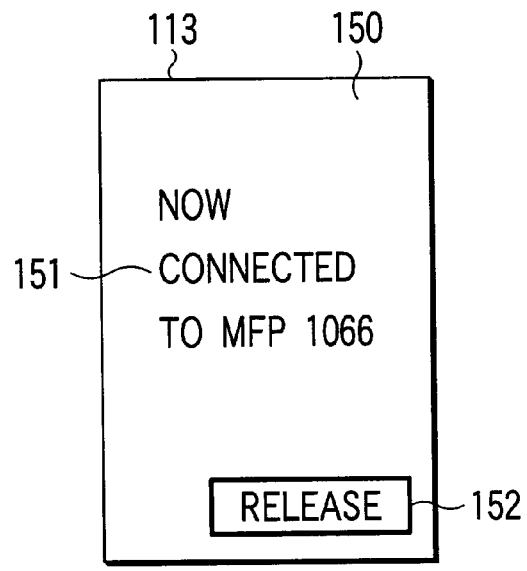
FIG. 14 is a view showing a display example displayed on the display section of the portable telephone when it is connected by use of the first connection method.

On the guide screen 150 shown in FIG. 14, a state guiding section 151 and release box 152 are displayed. The state guiding section 151 guides and displays the present state of the portable telephone 51. The release box 152 is specified when the user wants to break the connection with the multi functional peripheral. In the display example shown in FIG. 14, the guidance "NOW CONNECTED TO MFP 1066" is displayed on the state display section 151. Therefore, the user can confirm the type of the multi functional peripheral to which the portable telephone 51 is connected. When the release box 152 is specified, the control section 111 releases the connection state with the multi functional peripheral.

Next, the second connection method explained with reference to FIG. 6 is explained in detail with reference to FIGS. 15, 16, 17, 18.

Figure 15:
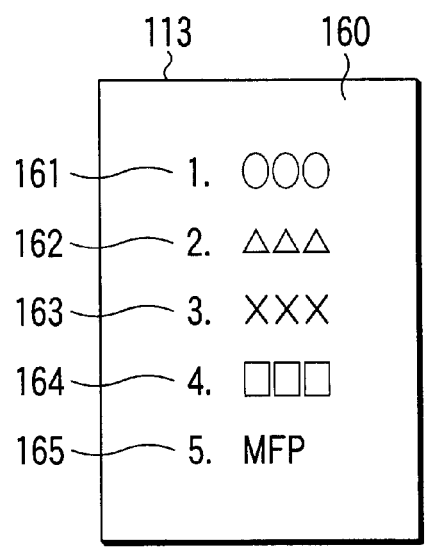
FIG. 15 is a view showing a display example displayed on the display section of the portable telephone when it is connected by use of the second connection method.

FIG. 15 shows an example in which a menu screen 160 is displayed on the display section 113 of the portable telephone 61. The menu screen 160 is displayed by operating the operating section 112 of the portable telephone 61. Five selection items are displayed on the menu screen 160. As the five selection items, "1.○○○" 161, "2.ΔΔΔ" 162, "3.X X X" 163, "4.□□□" 164 and "5.MFP" 165 are displayed.

Figure 16:
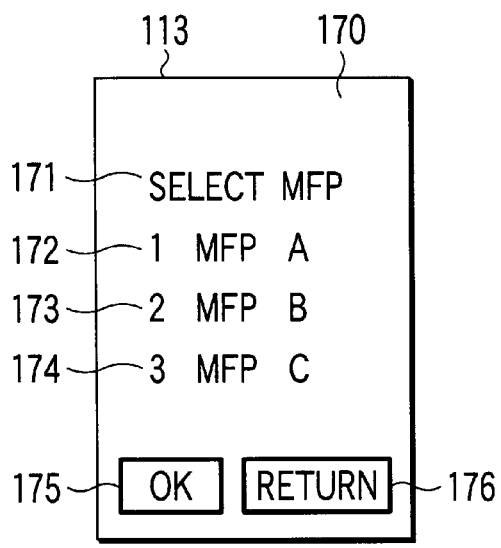
FIG. 16 is a view showing a display example displayed on the display section of the portable telephone when it is connected by use of the second connection method.

If the operating section 112 is operated to select "5.MFP" 165 on the menu screen 160, the control section 111 is set into a connection mode for connection with the multi functional peripheral. When the connection mode for connection with the multi functional peripheral is set, a multi functional peripheral selection screen 170 shown in FIG. 16 is displayed on the display section 113.

On the multi functional peripheral selection screen 170, one multi functional peripheral to be connected is selected from a plurality of multi functional peripherals. Further, in a case where only one multi functional peripheral is provided, the multi functional peripheral selection screen is displayed for confirmation.

On the multi functional peripheral selection screen 170, an operation guiding section 171, selection items 172 to 174, OK box 175, and return box 176 are displayed.

On the operation guiding section 171, the operation guidance for the user is displayed. On the selection items 172 to 174, information items indicating multi functional peripherals to be selected are displayed. The OK box 175 is specified when the selected selection item is correct. The return box 176 is specified when the screen is returned to the preceding screen.

In an example shown in FIG. 16, the guidance "SELECT MFP" is displayed on the operation guiding section 171 and "1 MFP A", "2 MFP B", "3 MFP C" are displayed as the selection items. According to the above operation guidance, the user selects a multi functional peripheral which he wants to use from the selection items 172 to 174 by use of the operating section 112. For example, the multi functional peripheral A 62 is selected, the user selects "1 MFP A" 172 from the selection items. Then, when "1 MFP A" 172 is selected, the user selects the input box 175. At this time, if the user wants to return the display screen to the menu screen 160 as a preceding state from the selection screen 170 which is now displayed on the display section 113, the return box 176 is selected.

Figure 17:
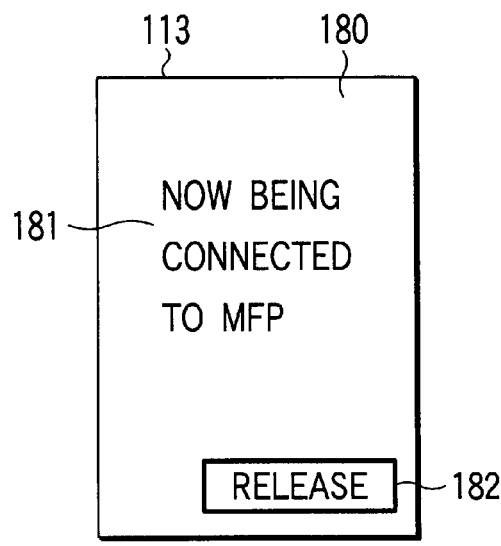
FIG. 17 is a view showing a display example displayed on the display section of the portable telephone when it is connected by use of the second connection method.

If the selection item is selected on the selection screen 170 and the OK box 175 is selected, the control section 111 starts the process for connection with the multi functional peripheral A 62. When the control section 111 starts the process for connection with the multi functional peripheral A 62, the control section 111 displays a guide screen 180 which indicates that it is now in process for connection with the multi functional peripheral A 62 on the display section 113 as shown in FIG. 17. On the guide screen 180, a state guiding section 181 and release box 182 are displayed.

The state guiding section 181 displays the present state of the portable telephone. The release box 182 is specified when the user cancels the process for connection with the multi functional peripheral. When the release box 182 is specified, the control section 111 cancels the process for connection with the multi functional peripheral which is now being effected. In the example shown in FIG. 17, "NOW BEING CONNECTED TO MFP" is displayed on the state display section 181.

Figure 18:
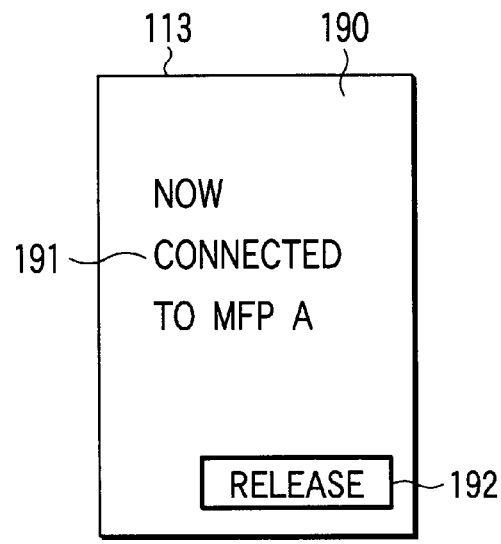
FIG. 18 is a view showing a display example displayed on the display section of the portable telephone when it is connected by use of the second connection method.

If the release box 182 is not specified and connection with the multi functional peripheral is set up, a guide screen 190 indicating a state in which connection between the multi functional peripheral A 52 and the portable telephone 61 is set up as shown in FIG. 18 is displayed on the display section 113.

On the guide screen 190, a state guiding section 191 and release box 192 are displayed. The state guiding section 191 guides and displays the present state of the portable telephone 61. The release box 192 is specified when the user wants to break the connection with the multi functional peripheral. In the example shown in FIG. 18, "NOW CONNECTED TO MFP A" is displayed on the state display section 191. Therefore, the user can confirm the type of the multi functional peripheral to which the portable telephone 61 is connected. When the release box 192 is specified, the control section 111 releases the connection with the multi functional peripheral which is now connected.

Figure 19:
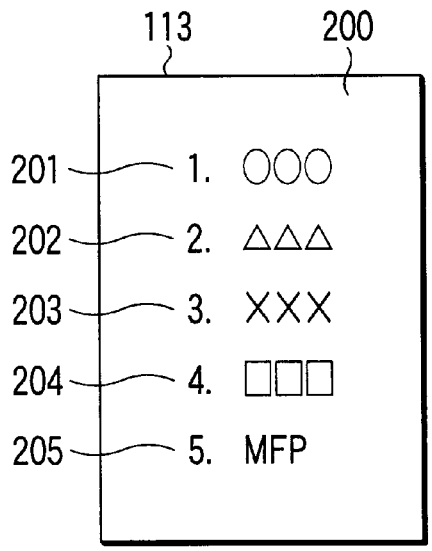
FIG. 19 is a view showing a display example displayed on the display section of the portable telephone when it is connected by use of the third connection method.

Next, the third connection method explained with reference to FIG. 7 is explained by using a display example of the portable telephone 71 shown in FIGS. 19, 20. FIG. 19 shows an example in which a menu screen 200 is displayed on the display section 113 of the portable telephone 71. The menu screen 200 is displayed by operating the operating section 112 of the portable telephone 71.

Five selection items are displayed on the menu screen 200 as shown in FIG. 19. As the five selection items, "1.○○○" 201, "2.ΔΔΔ" 202, "3.X X X" 203, "4.□□□" 204 and "5.MFP" 205 are displayed.

It is now assumed that the operating section 112 is operated to select "5.MFP" 205 on the menu screen 200. Then, the control section 111 is set into a connection mode for connection with the multi functional peripheral. When the connection mode for connection with the multi functional peripheral is set, a guiding screen 210 indicating that it is now set in the connection mode for connection with the multi functional peripheral as shown in FIG. 20 is displayed on the display section 113.

On the guiding screen 210, a state guiding section 211 and release box 212 are displayed. On the state guiding section 211, the present state of the portable telephone 71 is displayed. The release box 212 is specified when the user wants to cancel the connection mode. When the release box 212 is specified, the control section 111 releases the mode for connection with the multi functional peripheral.

Figure 20:
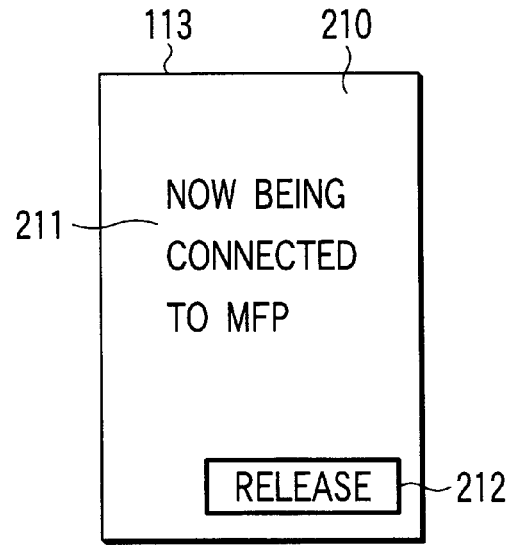
FIG. 20 is a view showing a display example displayed on the display section of the portable telephone when it is connected by use of the third connection method.

In the example shown in FIG. 20, the guidance "NOW BEING CONNECTED TO MFP" indicating that it is now set in the mode of connection with multi functional peripheral is displayed on the state guiding section 211. In a state in which the guide screen 210 is displayed, the user connects the portable telephone with the multi functional peripheral by use of a cable. Thus, connection between the portable telephone and the multi functional peripheral is set up.

Next, a fourth connection method is explained. The fourth connection method is similar to the second connection method. In the second connection method, the multi functional peripherals always generate the broadcast signals and the portable telephone receives the broadcast signals from the multi functional peripherals so as to recognize the available multi functional peripherals.

However, in the fourth connection method, the available multi functional peripherals do not always generate broadcast signals. That is, in the fourth connection method, when the user wants to connect the portable telephone to a multi functional peripheral, the portable telephone first transmits a broadcast signal indicating that the user wants to use a multi functional peripheral. Then, if a plurality of multi functional peripherals which have received the broadcast signal from the portable telephone are available, they return signals indicating that they are can be used to the portable telephone. Thus, the portable telephone can acquire information of available multi functional peripherals. In the fourth connection method, the construction of the multi functional peripheral, portable telephone and server is the same as that shown in FIG. 6.

Figure 21:
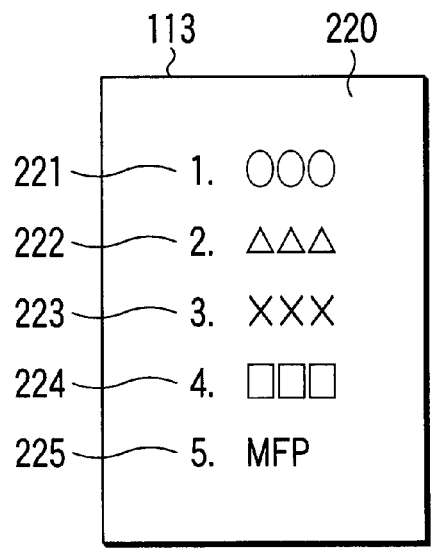
FIG. 21 is a view showing a display example displayed on the display section of the portable telephone when it is connected by use of the fourth connection method.

The fourth connection method is explained with reference to the construction of FIG. 6 and the display example of the portable telephone shown in FIGS. 21, 22, 23, 24. FIG. 21 shows an example in which a menu screen 220 is displayed on the display section 113 of the portable telephone 61. The menu screen 220 is displayed by operating the operating section 112. Five selection items are displayed on the menu screen 220. As the five selection items, "1.○○○" 221, "2.△△△" 222, "3.X X X" 223, "4.□□□" 224 and "5.MFP" 225 are displayed.

Figure 22:
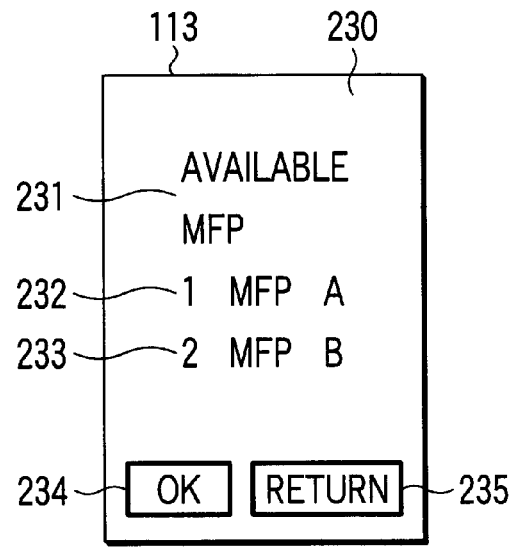
FIG. 22 is a view showing a display example displayed on the display section of the portable telephone when it is connected by use of the fourth connection method.

If the operating section 112 is operated to select "5.MFP" 225 on the menu screen 220, the portable telephone 61 is set into a connection mode for connection with the multi functional peripheral. When the connection mode for connection with the multi functional peripheral is set, a multi functional peripheral selection screen 230 shown in FIG. 22 is displayed on the display section 113. On the multi functional peripheral selection screen 230, available multi functional peripherals are displayed. The user selects one of the multi functional peripherals while watching the selection screen 230.

When "5.MFP" 225 is selected on the menu screen 220, the control section 111 transmits a broadcast signal via the multi functional peripheral interface 117. The broadcast signal is a signal for requesting that responses are sent back from available multi functional peripherals. The multi functional peripheral which has received the broadcast signal from the portable telephone 61 sends back a response indicating that it is available to the portable telephone 61 if it is available. When the control section 111 receives the response from the available multi functional peripheral, it displays the selection screen 230 on the display screen 113. All of the available multi functional peripherals are displayed on the selection screen 230.

For example, it is assumed that the multi functional peripheral A 62 and multi functional peripheral B 63 are available in the construction shown in FIG. 6. In this case, the multi functional peripheral selection screen 230 shown in FIG. 22 is displayed on the display section 113.

On the multi functional peripheral selection section 230, an operation guiding section 231, selection items 232, 233, OK box 234 and return box 235 are displayed. On the operation guiding section 231, operation guidance is displayed. On the selection items 232, 233, available multi functional peripherals are displayed. A multi functional peripheral which is required to be connected is selected from the selection items 232, 233. The OK box 234 is selected when the selected multi functional peripheral is correct. The return box 235 is selected when the screen is returned to the preceding screen.

In the example shown in FIG. 22, the guidance "AVAILABLE MFP" is displayed on the operation guiding section 231 and "1 MFP A" 232 and "2 MFP B" 233 are displayed as the selection items.

In the example shown in FIG. 22, a multi functional peripheral is selected from the two available multi functional peripherals among the three multi functional peripherals. If the multi functional peripheral A 62 is selected, the user selects "1 MFP A" 232 from the selection items and specifies the OK box 234. Then, the control section 111 starts the process for connection with the multi functional peripheral A 62.

When the control section 111 starts the process for connection with the multi functional peripheral selected on the selection screen 230, it displays a guide screen 240 on the display section 113. On the guide screen 240, a state guiding section 241 and release box 242 are displayed. The state guiding section 241 displays the present state of the portable telephone. The release box 242 is selected when the user wants to cancel the connection process.

Figures 23, 24:
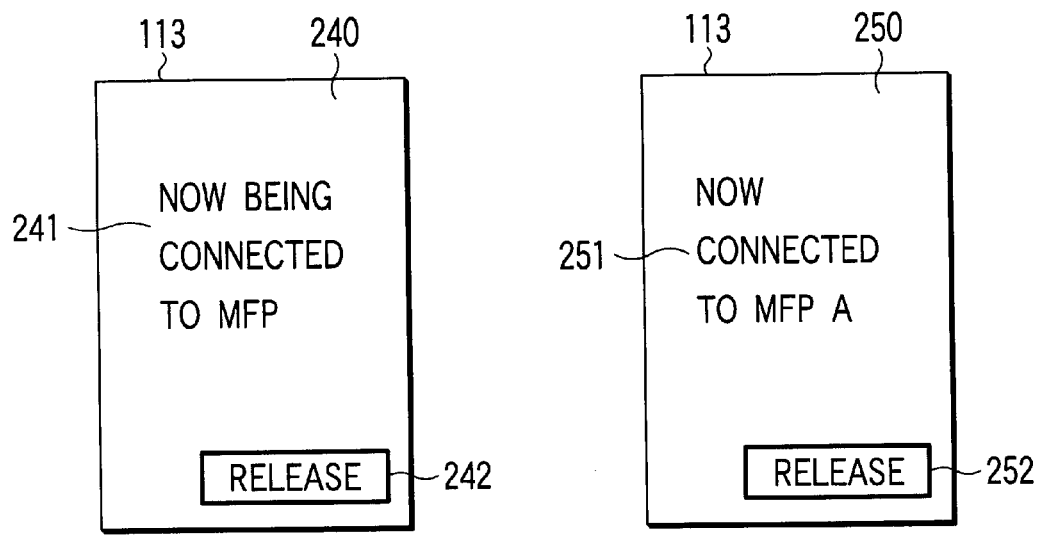
FIG. 23 is a view showing a display example displayed on the display section of the portable telephone when it is connected by use of the fourth connection method.
FIG. 24 is a view showing a display example displayed on the display section of the portable telephone when it is connected by use of the fourth connection method.

In the example shown in FIG. 23, the guidance "NOW BEING CONNECTED TO MFP" is displayed on the state guiding section 241. If the release box 242 is not selected and connection with the multi functional peripheral A 62 is set up, the control section 111 displays a guide screen 250 indicating that connection is set up as shown in FIG. 24.

On the guide screen 250, a state guiding section 251 and release box 252 are displayed. The state guiding section 251 displays the present state of the portable telephone. The release box 252 is selected when the user wants to release (break) the connection.

In the example shown in FIG. 24, the guidance "NOW CONNECTED TO MFP A" is displayed on the state guiding section 251. Therefore, the user can confirm the type of the multi functional peripheral which is now connected.

Next, the operation of the multi functional peripheral is explained with reference to a display example displayed on the display section 93 of the operation panel 83.

In the multi functional peripheral, user authentication is required for setting up connection with the portable telephone. The user authentication is used for checking whether or not the user of the portable telephone to be connected is a correct user.

The user authentication is made by checking whether or not a password input by the user is correct in the multi functional peripheral before the formal connection is set up. The password is encoded by the multi functional peripheral by use of SSL (Secure Sockets Layer) and transmitted to the portable telephone. The coded password transmitted from the multi functional peripheral is received by the multi functional peripheral interface 119 of the portable telephone. When receiving the coded password, the control section 111 of the portable telephone decodes the password and determines whether or not the decoded password is correct. The result of determination is transmitted to the multi functional peripheral from the portable telephone. At this time, only the result of determination is transmitted to the multi functional peripheral from the portable telephone.

The user authentication is performed before the formal connection is set up. In the first connection method, the user authentication is performed while the guide screen 140 as shown in FIG. 13 is being displayed on the display section 113 of the portable telephone. In the second connection method, the user authentication is made while the guide screen 180 as shown in FIG. 17 is being displayed on the display section 113 of the portable telephone.

In the third connection method, the user authentication is performed while the guide screen 210 as shown in FIG. 20 is being displayed on the display section 113 of the portable telephone. In the fourth connection method, the user authentication is made while the guide screen 240 as shown in FIG. 23 is being displayed on the display section 113 of the portable telephone. That is, in the first, second, third and fourth connection methods, the user is urged to input the password for the multi functional peripheral in a state in which the guide screen 140, 180, 210 or 240 is displayed on the display section 113 of the portable telephone.

Figure 25:
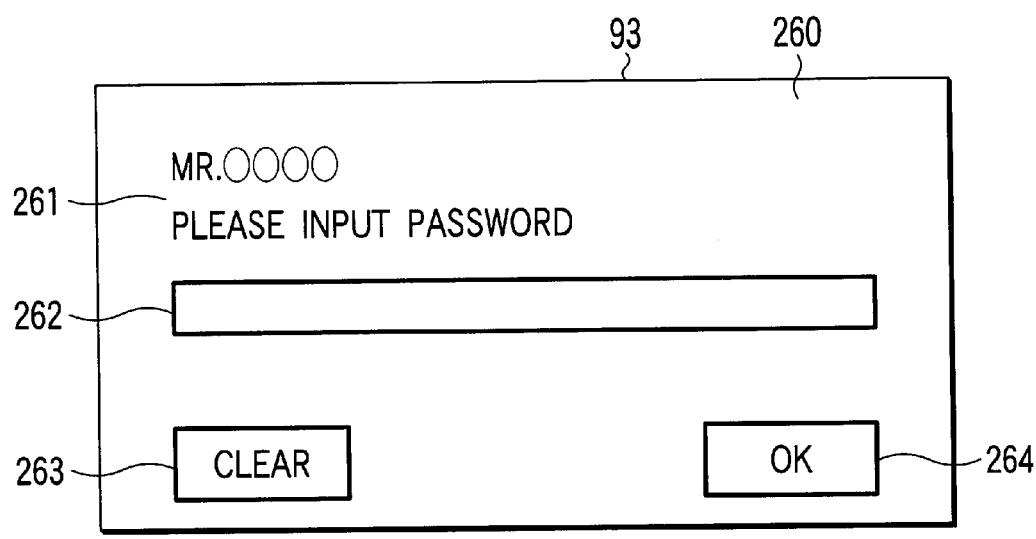
FIG. 25 is a view showing a display example of a password input screen for user authentication displayed on a display section of the multi functional peripheral.

FIG. 25 shows a password input screen 260 for the user authentication. In FIG. 25, the display screen of the display section 93 of the operation panel 83 is displayed. In the multi functional peripheral of this embodiment, as shown in FIG. 8, the operation panel 83 includes the display section 93 containing the touch panel 93a and the hard key pad 94.

In FIG. 25, a display example of the password input screen 260 on the display section 93 is shown. On the password input screen 260, an operation guiding section 261, password input box 262, clear button 263, OK button 264 are displayed. On the operation guiding section 261, operation guide for the user is displayed. In the example shown in FIG. 25, the guidance "MR. ○○○, PLEASE INPUT PASSWORD" is displayed on the operation guiding section 261.

An asterisk "*" is displayed on the password input box each time part of the password is input by use of the hard key pad 94. The clear button 263 is a button for canceling the password input to the password input box 262. If the clear button 263 is touched, the input password is cleared. The OK button 264 is a button touched when the input operation of the password is completed. When the OK button 264 is touched, the password which has been input is transmitted to the portable telephone.

When the password is input on the password input screen 260 and the OK button 264 is touched, the controller 81 transmits the password input via the portable telephone I/F 88 to the portable telephone. The portable telephone determines whether the password received from the multi functional peripheral is correct or not and transmits only the result of determination to the multi functional peripheral.

When receiving the result of determination indicating that the password is correct from the portable telephone, the multi functional peripheral sets up connection with the portable telephone. Further, when receiving the result of determination indicating that the password is not correct from the portable telephone, the multi functional peripheral interrupts the connection with the portable telephone.

If the connection is set up, the display contents of the display section of the portable telephone are changed from the guide screen indicating that it is now being connected to the guide screen indicating that connection is set up. For example, in the first connection method, the guide screen is changed from the guide screen 140 of FIG. 13 to the guide screen 150 of FIG. 14, in the second connection method, the guide screen is changed from the guide screen 180 of FIG. 17 to the guide screen 190 of FIG. 18, in the third connection method, the guide screen is changed from the guide screen 210 of FIG. 20 to a guide screen (not shown) indicating that the connection is set up, and in the fourth connection method, the guide screen is changed from the guide screen 240 of FIG. 23 to the guide screen 250 of FIG. 24.

Figure 26:
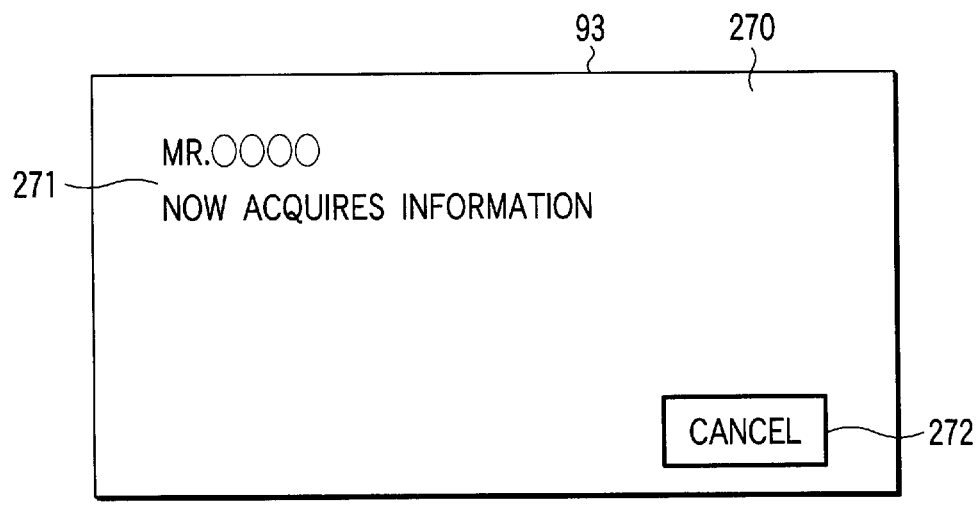
FIG. 26 is a view showing a display example of a guide screen displayed on the display section of the multi functional peripheral while the multi functional peripheral acquires setting information associated with the user from the server.

When connection between the portable telephone and the multi functional peripheral is set up, the multi functional peripheral acquires setting information associated with the user from the server. FIG. 26 is a view showing a display example of a guide screen 270 on the display section 93 of the multi functional peripheral while the multi functional peripheral is acquiring user setting information from a server. On the guide screen 270, an operation guiding section 271 and cancel button 272 are displayed. On the operation guiding section 271, the present state of the multi functional peripheral is displayed.

In the display example shown in FIG. 26, the guidance "MR. ○○○○ IS ACQUIRING INFORMATION" is displayed on the operation guiding section 271. The cancel button 272 is specified (touched) when the present state is cancelled. For example, if the cancel button 272 is specified while the guide screen 270 as shown in FIG. 26 is displayed, the multi functional peripheral interrupts the process for acquiring user setting information from the server.

Figure 27:
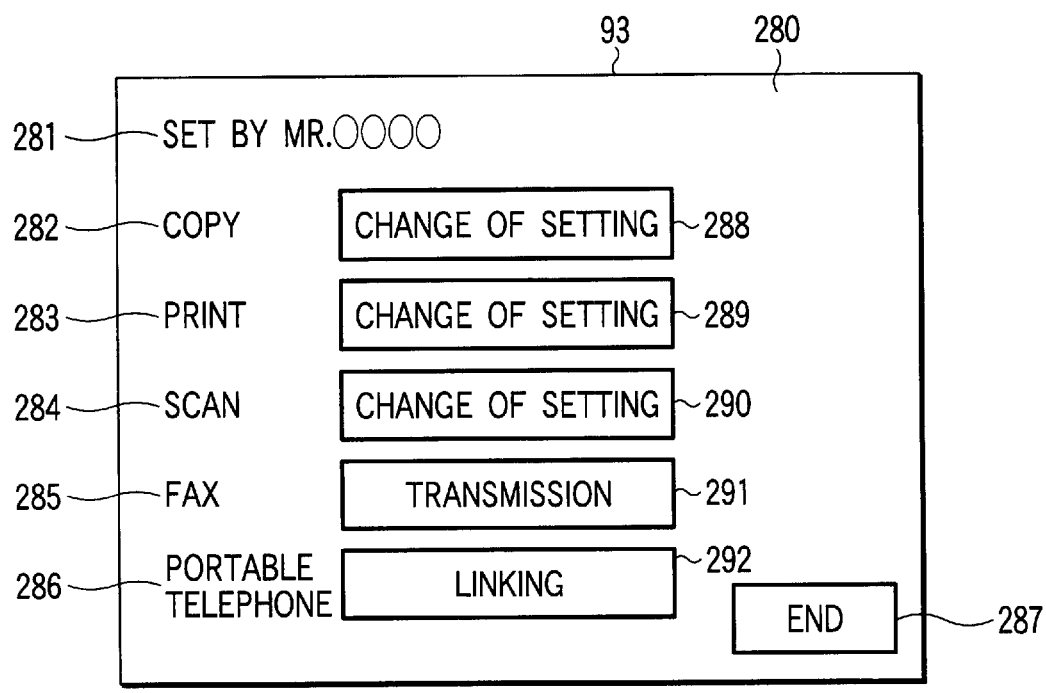
FIG. 27 is a view showing a display example of a user menu screen displayed on the display section of the multi functional peripheral when the multi functional peripheral has acquired information from the server.

If the cancel button 272 is not specified and the process for acquiring the user setting information from the server is terminated, a user menu screen 280 for each user as shown in FIG. 27 is displayed on the display section 93.

The user menu screen 280 is displayed based on the user setting information acquired from the server and permits the operation and setting for each user to be performed. The contents of the screen displayed as the user menu screen 280 are based on information previously stored in the user DB 104 and rule DB 103 of the server.

The display contents of the user menu screen 280 are displayed in correspondence to the type based on the user DB 104 and rule DB 102. The display contents of the user menu screen 280 are different for each user and reflect the setting contents of each user.

When the type of the multi functional peripheral for displaying the user menu screen is changed, the user menu screen 280 is changed to a display screen which is relatively similar to the user menu screen 280. Since the sizes of the display sections of the different multi functional peripherals are different, it is difficult to attain exactly the same display screen, but it is designed to attain a display screen which is as close to the original user menu screen as possible without degrading the operability of the user. Therefore, in the different types of image processing apparatuses, setting information for each user can be set to the closest values and the operability of the user can be enhanced.

For example, if the display section of the multi functional peripheral becomes smaller, the whole portion of the display screen is made small without changing the size of the button displayed by the touch panel of the display section. As a result, the button operated by the user is not made small and the screen with the layout which is similar to the original one can be displayed.

For this purpose, information of the sizes of the display sections of the respective types is stored in the rule DB 102. The contents of the user menu screen are given from the server. In the server, the display contents are processed to provide similar display in the respective types based on the contents stored in the rule DB 102.

As shown in FIG. 27, on the user menu screen 280, a user information display section 281, copy setting section 282, print setting section 283, scan setting section 284, FAX setting section 285, portable telephone setting section 286 and end button 287 are displayed. On the user information display section 281, a user name or the like is displayed.

For example, in the example shown in FIG. 27, the guidance "SET BY MR. ○○○○" is displayed on the user information display section 281. The copy setting section 282 has a setting changing button 288 for specifying execution of copy setting.

The print setting section 283 has a setting changing button 289 for specifying execution of print setting. The scan setting section 284 has a setting changing button 290 for specifying execution of scan setting. The FAX setting section 285 has a transmission button 291 for specifying execution of facsimile setting. The portable telephone setting section 286 has a linking button 292 for specifying execution of setting of connection with a portable telephone.

That is, in the copy setting section 282, setting of the default is made when the user uses the copy function in the multi functional peripheral. When the setting is changed, the setting changing button 288 of the copy setting section 282 is touched. In the print setting section 283, setting of the default is made when the user uses the print function in the multi functional peripheral. When the print setting is changed, the setting changing button 289 of the print setting section 283 is touched.

In the scan setting section 284, setting is made when the user uses the scan function in the multi functional peripheral. When the scan setting is changed, the setting changing button 290 of the scan setting section 284 is touched. In the FAX setting section 285, setting of the default is made when FAX transmission is performed from the multi functional peripheral. When the facsimile transmission setting is changed, the transmission button 291 of the FAX setting section 285 is touched.

In the portable telephone setting section 286, the linking button 292 is touched when setting of the portable telephone which is connected to the multi functional peripheral is changed. If the linking button 292 is touched, the multi functional peripheral makes setting of the portable telephone which is connected thereto by inputting data to the operation panel 83.

Next, a case wherein settings of the defaults of the copy function and print function are changed by use of the user menu screen 280 is explained.

Figure 28:
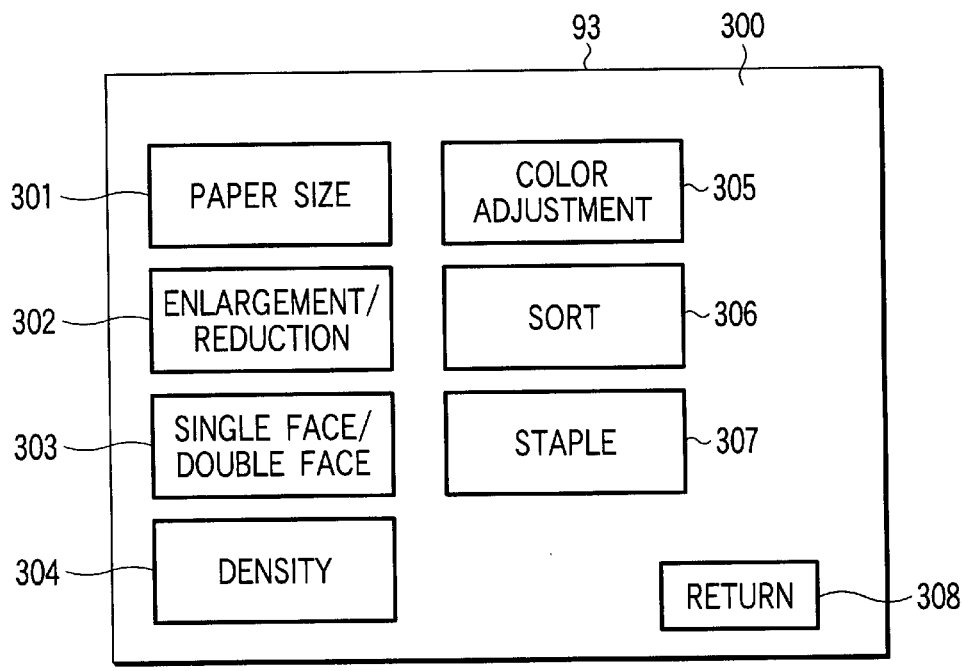
FIG. 28 is a view showing a display example of a copy function or printing function setting screen displayed on the display section of the multi functional peripheral.

FIG. 28 is a view showing a display example of a copy and printing attribute setting screen 300 displayed on the display section 93 when the setting changing button 288 or setting changing button 289 is touched. The setting screen 300 shown in FIG. 28 is obtained when the setting screen for the copy function and the setting screen for the print function are the same. The setting screen for the copy function and the setting screen for the print function may be different from each other in some cases depending on the setting items and the type of the multi functional peripheral.

On the setting screen 300 shown in FIG. 28, a paper size setting button 301, enlargement/reduction button 302, single-face/double-face button 303, density button 304, color adjustment button 305, sort button 306, staple button 307 and return button 308 are displayed.

The paper size setting button 301 sets the paper size. The enlargement/reduction button 302 sets the enlargement or reduction. The single-face/double-face button 303 sets the single-face printing or double-face printing. The density button 304 sets printing density. The color adjustment button 305 sets the adjustment of color when the printer section of the multi functional peripheral is designed for color printing. The sort button 306 sets the sorting method of paper sheets after printing. The staple button 307 sets whether the sheets of paper after printing are stapled or not. The return button 308 specifies that the display screen is returned to the preceding user menu screen 280.

When the paper size setting button 301 is touched, a screen (not shown) for selecting paper is displayed on the display section 93 to permit selection of the size of printing paper. When the enlargement/reduction button 302 is touched, a screen (not shown) for inputting the enlarging magnification or reduction ratio is displayed on the display section 93 to permit setting of the copy magnification. When the single-face/double-face button 303 is touched, a screen (not shown) for selecting the single-face printing or double-face printing is displayed on the display section 93 to permit selection of the printing condition.

When the density button 304 is touched, a screen (not shown) for setting the density is displayed on the display section 93 to permit selection of the printing density. When the color adjustment button 305 is touched, a screen (not shown) for adjusting color is displayed on the display section 93 to permit setting of color adjustment. The color adjustment can be made for each color of yellow, magenta, cyan and black. When the sort button 306 is touched, a screen (not shown) for setting the paper sorting is displayed on the display section 93 to permit setting of the paper sorting.

In the setting of the sorting, whether the sorting operation is effected when a plurality of copies are printed or the paper sheets are collected for each group is determined. When the staple button 307 is touched, a screen (not shown) for setting the staple is displayed on the display section 93 to determine whether the printed sheets of paper sorted are stapled or not and set the stapling position if they are stapled. When the return button 308 is touched, the preceding user menu screen 280 is displayed on the display section 93.

Figure 29:
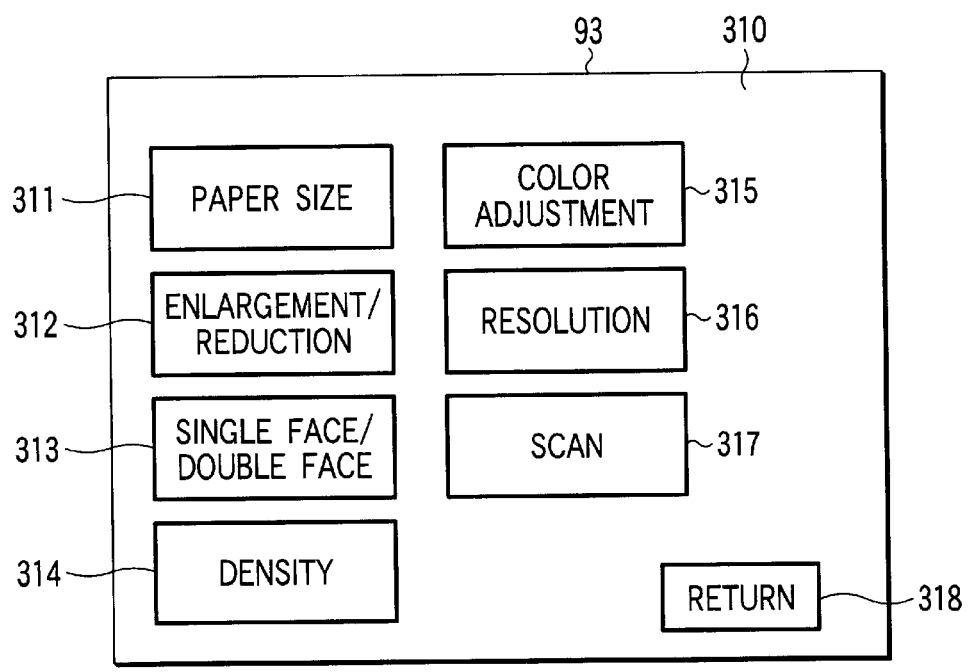
FIG. 29 is a view showing a display example of a scanning function setting screen displayed on the display section of the multi functional peripheral.

Next, a case where the scan function is used is explained. FIG. 29 shows a display example of a scan function setting screen 310 when the setting changing button 290 of the scan setting section 284 is touched on the user menu screen 280.

On the scan function setting screen 310 shown in FIG. 29, a paper size button 311, enlargement/reduction button 312, single-face/double-face button 313, density button 314, color adjustment button 315, resolution button 316, scan button 317 and return button 318 are displayed.

The paper size button 311 is used to set the size of an original. The enlargement/reduction button 312 is used to enlarge or reduce the size of the original. The single-face/double-face button 313 is used to select one of operation modes of an automatic original feeder (not shown) by which the single-face or double-face of the original is scanned. The density button 314 is used to set the density when the original is scanned. The color adjustment button 315 is used to adjust color when the original is scanned.

The resolution button 316 is used for setting the resolution when the original is scanned. The scan button 317 is used for specifying execution of the scanning operation. When the scanning button 317 is specified, a setting screen 320 which will be described later is displayed in order to select a process for the scanned image before the scanning operation is actually effected. After the process for the scanned image is selected based on the setting screen 320, the actual scanning operation is started in response to specification of a start key (not shown). The return button 318 specifies that the screen returns to the preceding user menu screen 280.

If the paper size button 311 is touched, a screen (not shown) used for selecting the size of the original is displayed on the display section 93 to permit selection of the size of the original. If the enlargement/reduction button 312 is touched, a screen (not shown) used for inputting the magnification or reduction ratio is displayed on the display section 93 to permit setting of the magnification. If the single-face/double-face button 313 is touched, a screen (not shown) used for selecting one of the operation modes of the automatic original feeder (not shown) by which the original is fed to scan the single face or double faces thereof is displayed on the display section 93 to permit selection of the original feeding method.

If the density button 314 is touched, a screen (not shown) used for setting the density is displayed on the display section 93 to permit selection of the density of image data after the original has been scanned. If the color adjustment button 315 is touched, a screen (not shown) used for adjusting the color is displayed on the display section 93 to permit adjustment of the color of image data after the original has been scanned. In the color adjusting process, the color adjustment can be made for each color of red, green, blue, for example. If the resolution button 316 is touched, a screen (not shown) used for setting the resolution is displayed on the display section 93 to permit selection of the resolution used when the original is scanned.

Figure 30:
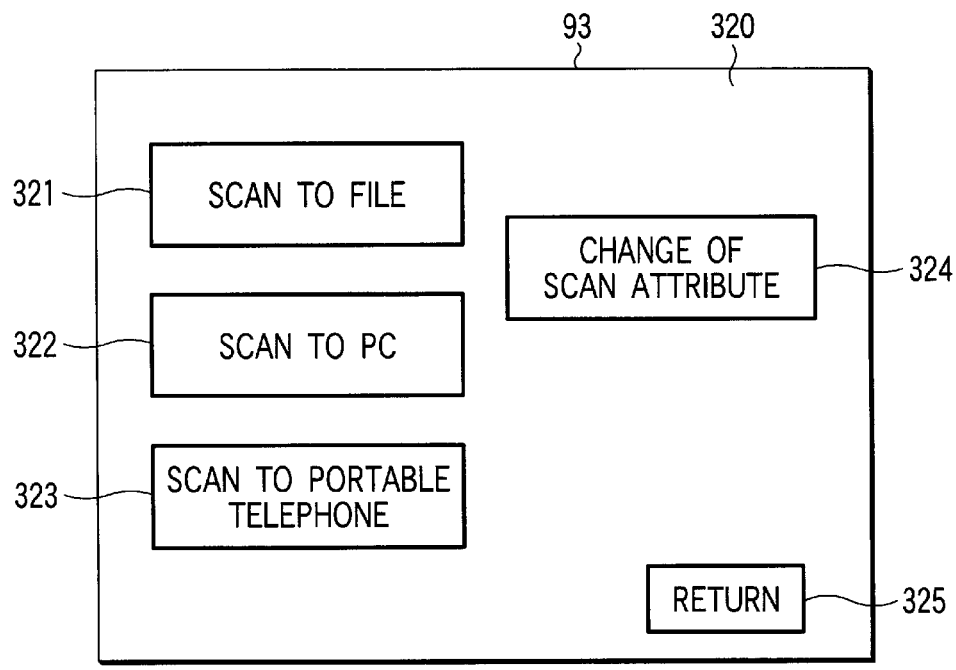
FIG. 30 is a view showing a display example of a setting screen for setting a method for processing image data obtained by scanning when the scanning operation is selected on the setting screen of FIG. 29.

If the scan button 317 is touched, the setting screen 320 used for selecting one of processes for dealing with the scanned image as shown in FIG. 30 is displayed on the display section 93. The setting screen 320 is explained in detail later. If the return button 318 is touched, the preceding user menu screen 280 is displayed on the display section 93.

FIG. 30 shows the setting screen 320 used for selecting one of the processes for dealing with the scanned image. The setting screen 320 is displayed by touching the scan button 317 on the setting screen 310. On the setting screen 320, one of the processes for dealing with the scanned original image is specified. The actual scanning operation is effected in response to input of the start key after the process for dealing with the scanned image is selected on the setting screen 320.

In this embodiment, a case wherein image data is stored into the server in a file form, a case wherein image data is transmitted to a personal computer (PC), and a case wherein image data is transmitted to a portable telephone are explained. When image data is stored in a file form, the image data is stored in the hard disk 103 or document DB 108 of the server 100. When image data is transmitted to a PC, the image data is transmitted by a mail to which the image data is attached by the server 100 or by use of FTP.

In the above example, the PC of the transmission destination may be a user PC specified by user information or a PC previously set and specified. When image data is transmitted to a portable telephone, the image data is modified in the portable telephone or further transmitted from the portable telephone to another portable telephone or telephone. In this example, it is assumed that the portable telephone of the transmission destination is a portable telephone with which connection is set up.

On the setting screen 320 of FIG. 30, a screen used for selecting one of the above three processes for dealing with image data is displayed. On the setting screen 320, a Scan To File button 321, Scan To PC button 322, Scan To Portable Telephone button 323, Scan Attribute changing button 324 and return button 325 are displayed.

The Scan To File button 321 is used to select the process for setting scanned image data into a file and storing the same into the server. The process for setting the scanned image data into a file form and storing the same into the server is set by touching the Scan To File button 321.

The Scan To PC button 322 is used to select the process for transmitting scanned image data to a user PC as an external device. The process for transmitting the scanned image data to the PC via the communication line is set by touching the Scan To PC button 322.

The Scan To Portable Telephone button 323 is used to select the process for transmitting scanned image data to a portable telephone. The process for transmitting the scanned image data to the portable telephone which is connected thereto is set by touching the Scan To Portable Telephone button 323. If the start key is depressed after the Scan To File button 321, Scan To PC button 322 or Scan To Portable Telephone button 323 is selected, the multi functional peripheral starts the original scanning process.

The Scan Attribute changing button 324 is used to cancel execution of the scanning operation and specify that the screen returns to the setting screen 310 on which the scan attribute is set. When the Scan Attribute changing button 324 is touched, the setting screen 310 as shown in FIG. 29 is displayed on the display section 93. The return button 325 is used to cancel execution of the scanning operation and specify that the screen return to the user menu screen 280. When the return button 325 is touched, the user menu screen 280 as shown in FIG. 27 is displayed on the display section 93.

The process effected when the start key is depressed after the Scan To File button 321, Scan To PC button 322 or Scan To Portable Telephone button 323 is selected is explained. In this case, the multi functional peripheral causes the scanner section to scan the original and transmits the scanned image according to the selected button.

For example, if the Scan To File button 321 is selected, scanned image data is transferred to the server. At this time, in the construction in which the server and the multi functional peripheral are connected to each other, the scanned image is directly transmitted from the multi functional peripheral to the server, but in the construction in which the server is connected to the multi functional peripheral via the portable telephone, the scanned image is transmitted to the server via the portable telephone.

Like the case wherein the Scan To File button 321 is selected, if the Scan To PC button 322 is selected, the scanned data is transmitted to the user PC via the portable telephone or directly transmitted from the multi functional peripheral to the user PC.

If the Scan To Portable Telephone button 323 is selected, the scanned image data is transferred from the multi functional peripheral to the portable telephone. At this time, it is possible to transmit the scanned image after converting the scanned image into image data which can be displayed on the portable telephone. For example, when the Scan To Portable Telephone button 323 is selected, whether the scanned image is transferred as image data displayed on the portable telephone or it is transferred as a file of scanned image data may be determined by the user.

In this case, if the process for transferring image data displayed on the portable telephone is selected, the multi functional peripheral determines information such as the resolution, size and image format used for display on the display section of the portable telephone based on the setting information corresponding to the user information acquired from the server.

The multi functional peripheral converts the scanned image into image data which can be displayed on the portable telephone based on the thus determined information by use of the image processing section. The multi functional peripheral transfers the thus converted image data to the portable telephone. As a result, the portable telephone can easily acquire an image which can be instantly displayed on the display section thereof by effecting the simple operation on the multi functional peripheral side.

Figure 31:
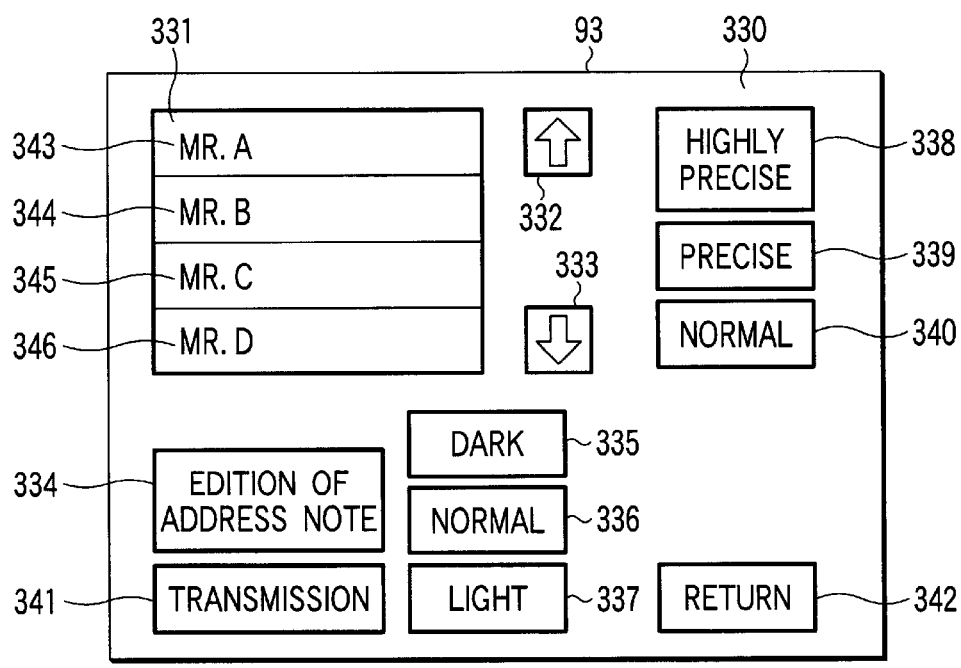
FIG. 31 is a view showing a display example of a facsimile function setting screen displayed on the display section of the multi functional peripheral.

Next, a case wherein the multi functional peripheral is used as a facsimile is explained. FIG. 31 shows a setting screen 330 used for setting information associated with facsimile transmission. The setting screen 330 is displayed when the transmission button 291 of the facsimile section 285 is touched on the user menu screen 280.

The setting screen 330 is a screen used for performing facsimile transmission. The facsimile function is set on the setting screen 330. On the setting screen 330, an address note used as facsimile transmission destinations can be edited. The address note is stored in the server in correspondence to user information.

On the setting screen 330, a transmission destination selecting window 331, scroll upward button 332, scroll downward button 333, address note editing button 334, "dark" button 335, normal button 336, "light" button 337, "highly precise" button 338, "precise" button 339, normal button 340, transmission button 341 and return button 342 are displayed.

On the window 331, a list of transmission destinations registered in the address note is displayed. The transmission destination is selected by touching one of the transmission destinations displayed on the window 331. The scroll upward button 332 is touched when information displayed on the window 331 is scrolled upwardly. The scroll downward button 333 is touched when information displayed on the window 331 is scrolled downwardly. The address note editing button 334 is touched when the address note displayed on the window 331 is edited.

The "dark" button 335 is touched when an original of high density is transmitted by facsimile. The normal button 336 is touched when an original of intermediate density is transmitted by facsimile. The "light" button 337 is touched when an original of low density is transmitted by facsimile.

The "highly precise" button 338 is touched when an original is transmitted by facsimile in a high precision mode. The "precise" button 339 is touched when an original is transmitted by facsimile in a precision mode. The normal button 340 is touched when an original is transmitted by facsimile in a normal precision mode. The transmission button 341 is touched when start of the facsimile transmission is specified. The return button 342 is touched when the display screen of the display section 93 is returned to the preceding user menu screen 280.

Information is displayed based on the address note received from the server on the window 331. In the example shown in FIG. 31, the names of four persons of the transmission destinations are displayed. If transmission destinations of five or more persons are present in the address note of the user, they can be displayed by scrolling the display contents of the window 331. The display contents of the window 331 are scrolled to display the transmission destinations by touching the scroll upward button 332 or scroll downward button 333.

If the transmission destination is selected from the names displayed on the window 331, the user touches a portion on which the name of the transmission destination is displayed. As a result, the name of the transmission destination touched by the user is reversedly displayed. The reversedly displayed name is set into the selected state as the transmission destination.

On the setting screen 330 shown in FIG. 31, Mr. A 343, Mr. B 344, Mr. C 345 and Mr. D 346 are displayed as the names of the transmission destinations which can be selected on the window 331. For example, when Mr. C 345 is selected, the user touches a portion in the window 331 on which "MR. C" 345 is displayed. As a result, the portion of "MR. C" 345 is reversedly displayed and set into the selected state.

Further, when the address note displayed on the window 331 is edited, the address note editing button 334 is touched. Then, a screen (not shown) used for editing the address note of the user registered in the server is displayed on the display section 93. By use of the screen, the user edits the address note for the user in the server.

The "dark" button 335, normal button 336 and "light" button 337 are buttons used for specifying the density of the original image. For example, when the density of the original image to be transmitted is high or when it is required to print the original image with a low density by a facsimile of the transmission destination, the "dark" button is selected. Further, when the density of the original image to be transmitted is low or when it is required to print the original image with a high density by a facsimile of the transmission destination, the "light" button is selected.

The "highly precise" button 338, "precise" button 339 and normal button 340 are buttons used for specifying the transmission resolution of the original image when the original image is transmitted. For example, when the image is transmitted with preference given to the resolution thereof, the "highly precise" button 338 is selected. If preference is given to the transmission speed rather than the resolution of the image to be transmitted, the normal button 340 is selected.

The transmission button 341 specifies start of the facsimile transmission. When the transmission button 341 is touched, the operation for scanning the original by the scanner 84 and transmitting the scanned image by the FAX modem 87 is effected. When the return button 342 is touched, the user menu screen 280 shown in FIG. 27 is displayed on the display section 93.

Next, a case wherein various settings of the portable telephone are made by use of the operation panel 83 of the multi functional peripheral is explained. FIG. 32 shows a setting screen 350 used for making various settings of the portable telephone. The setting screen 350 is displayed when the linking button 292 of the portable telephone setting section 286 is touched on the user menu screen 280 shown in FIG. 27. On the setting screen 350, various settings of the portable telephone are made.

On the setting screen 350, a mail transmission/reception button 351, Internet button 352, book mark arranging button 353, address note arranging button 354, calling tone setting button 355, setting changing button 356, and a return button 357 for returning the screen to the screen 280 of FIG. 26 are displayed.

The mail transmission/reception button 351 is selected when transmission/reception of a mail by use of the portable telephone and setting of the transmission/reception of a mail by use of the portable telephone are made. When the mail transmission/reception button 351 is touched, a screen (which will be described later) used for performing transmission/reception of a mail by use of the portable telephone or making setting of the transmission/reception of a mail by use of the portable telephone is displayed on the display section 93.

The Internet button 352 is touched when connection of the portable telephone to Internet and setting at the time of connection of the portable telephone to Internet are made. When the Internet button 352 is touched, a screen (which will be described later) used for making connection of the portable telephone to Internet or setting of items associated with connection of the portable telephone to Internet is displayed on the display section 93.

The book mark arranging button 353 is selected when URL (Uniform Resource Locator) or the like stored in the portable telephone as a book mark is arranged. The book mark is used for previously storing URL to which the user connects the portable telephone. When the portable telephone is connected to URL stored as the book mark, the connection can be made simply by selecting the connection destination based on the book mark without the necessity for the user to input URL. When the book mark arranging button 353 is touched, a screen used for arranging URL stored in the portable telephone as the book mark is displayed on the display section 93.

The portable telephone has an address note which stores telephone numbers and the like. In the address note, telephone numbers and mail addresses which the user often uses are stored. The address note arranging button 354 is selected when the address note stored in the portable telephone is arranged. When the address note arranging button 354 is touched, an operation screen (which will be described later) used for arranging the address note in the portable telephone is displayed on the display section 93.

The calling tone setting button 355 is selected when setting of a calling tone used by the portable telephone is made. When the calling tone setting button 355 is touched, a setting screen (which will be described later) used for setting the calling tone of the portable telephone is displayed on the display section 93. The setting changing button 356 is selected when various settings of the portable telephone are changed.

When the setting changing button 356 is touched, a setting screen (which will be described later) used for making various settings of the portable telephone is displayed on the display section 93. The various settings are inherent to each portable telephone. For example, the various settings include settings of a calling tone volume and received sound volume, waiting screen setting, setting of a timepiece in the portable telephone, setting of the brightness of the liquid crystal screen, auto-power OFF setting and the like.

Next, a case wherein the mail transmission/reception of the portable telephone is set by the multi functional peripheral is explained. Recently, there are many portable telephones each of which has a simple mail transmission/reception function attained only by use of the portable telephone. A method for attaining the mail transmission/reception function by the portable telephone by use of the operation panel 83 of the multi functional peripheral is explained.

FIGS. 33 and 34 show operation screens 360, 380 used for mailing by the portable telephone and displayed on the display section 93. FIG. 33 shows the operation screen 360 for mail reception and FIG. 34 shows the operation screen 380 for mail transmission. The operation screens 360, 380 are displayed on the display section 93 when the mail transmission/reception button 351 of the setting screen 350 shown in FIG. 32 is touched. The operation screen 360 for mail reception and the operation screen 380 for mail transmission can be switched by selecting one of a reception tab 361 and transmission tab 362 shown in FIGS. 33 and 34.

On the operation screen 360 for reception, a guidance display section 363, reception tab 361, transmission tab 362, reception mail window 364, upward scroll button 365, downward scroll button 366, printing button 367, open button 368, reply button 369, transfer button 370, delete button 371 and return button 372 are displayed.

The guidance display section 363 indicates that the screen is the operating screen for mailing. The reception mail window 364 displays received mails in a list form. The upward scroll button 365 is used for scrolling the reception mail window in the upward direction. The downward scroll button 366 is used for scrolling the reception mail window in the downward direction.

The printing button 367 is selected when the multi functional peripheral is caused to print the text of a received mail. The open button 368 is used for opening and displaying the received mail selected. The reply button 369 is selected to make a reply with respect to the received mail selected. The transfer button 370 specifies transfer of the received mail selected. The return button 371 is selected to return the screen to the setting screen 350 shown in FIG. 32.

In the operation screen 360 for reception shown in FIG. 33, an example in which four mails are displayed on the reception mail window 364 is shown. If a larger number of mails are present, the upward scroll button 365 or the downward scroll button 366 is touched to scroll the reception mail window 364 so as to display the mails.

When a mail is selected, the display portion of the mail is touched in a state in which the mail is displayed on the reception mail window 364. As a result, the display portion of the mail is reversedly displayed to indicate that the mail is set into the selected state.

In the case of the operation screen 360 shown in FIG. 33, four mails of a received mail 1 373, received mail 2 374, received mail 3 375 and received mail 4 376 are displayed on the reception mail window 364. For example, if the received mail 3 375 is selected, the user touches the display portion of the received mail 3 375 in the reception mail window 364.

As a result, the display portion of the received mail 3 375 is reversedly displayed to indicate that the mail is set into the selected state. When the selected mail is opened, the user touches the open button 368 while it is set in the reversedly displayed state (selected state). By the above operation, the text of the received mail 3 is displayed on the display section 93.

If the replay button 369 is touched on the operation screen 360 while the received mail is being selected, a screen (not shown) used for transmitting a reply with respect to the selected mail is displayed on the display section 93. Further, if the transfer button 370 is touched on the operation screen 360 while the received mail is being selected, a screen (not shown) used for transferring the selected mail is displayed on the display section 93.

If the delete button 371 is touched on the operation screen 360 while the received mail is being selected, the selected mail is deleted and omitted from the received mail window 364.

Further, if the printing button 367 is touched on the operation screen 360 while the received mail is being selected, the text of the selected mail is printed by the printer section 86 of the multi functional peripheral. If the return button 372 is touched on the operation screen 360, the setting screen 350 shown in FIG. 32 is displayed on the display section 93.

Next, the operation screen 380 for mail transmission shown in FIG. 34 is explained. The operation screen 380 for mail transmission is displayed when the transmission tab 362 is touched. The operation screen 380 for mail transmission indicates a state in which a mail can be transmitted by use of the portable telephone.

On the operation screen 380 for mail transmission, a guidance display section 363, reception tab 361, transmission tab 362, transmission mail window 381, upward scroll button 382, downward scroll button 383, printing button 384, open button 385, "new" button 386, delete button 387 and return button 388 are displayed.

The guidance display section 363 indicates that the screen is an operation screen associated with a mail. The transmission mail window 381 displays transmission mails in a list form. The upward scroll button 382 is used for scrolling the transmission mail window 381 in the upward direction. The downward scroll button 383 is used for scrolling the transmission mail window 381 in the downward direction. The printing button 384 is selected so as to cause the multi functional peripheral to print the text of the transmission mail. The open button 385 opens and displays the selected transmission mail. The "new" button 386 is selected to newly create a mail to be transmitted. The delete button 387 is selected to delete the selected transmission mail. The return button 388 is selected to return the screen to the setting screen 350 shown in FIG. 32.

In the operation screen 380 for mail transmission shown in FIG. 34, an example in which four mails are displayed on the transmission mail window 381 is shown. If a larger number of mails are present, the upward scroll button 382 or the downward scroll button 383 is touched to scroll the transmission mail window 381 so as to display the mails. When a mail is selected, the user touches the display portion in the transmission mail window 381 on which the mail to be selected is displayed. As a result, the touched display portion of the mail is reversedly displayed to indicate that the mail is set into the selected state.

In an example shown in FIG. 34, four mails of a transmission mail 1 389, transmission mail 2 390, transmission mail 3 391 and transmission mail 4 392 are displayed. For example, if the transmission mail 3 391 is selected, the user touches the display portion of the transmission mail 3 391. As a result, the display portion of the transmission mail 3 391 is reversedly displayed to indicate that the mail is set into the selected state.

When the selected mail is opened, the user touches the open button 385. When the open button 385 is touched, the text of the transmission mail 3 is displayed on the display section 93. If the "new" button 386 is touched, a screen (not shown) used for creating a new mail is displayed on the display section 93. The user can create and transmit a new mail by use of the screen for creating the new mail. Further, if a transmission mail is newly created, the newly created mail is added to the transmission mail window 381.

If the delete button 387 is touched on the operation screen 380 while the transmission mail is being selected, the selected mail is deleted and omitted from the transmission mail window 381. Further, if the printing button 384 is touched on the operation screen 380 while the transmission mail is being selected, the text of the selected mail is printed by the printer section 86 of the multi functional peripheral. If the return button 388 is touched on the operation screen 380, the setting screen 350 shown in FIG. 32 is displayed on the display section 93.

Next, a case wherein Internet connection is made via the portable telephone to which connection is set up by use of the operation panel 83 of the multi functional peripheral is explained.

FIG. 35 shows a display example of an operation screen 400 used when the multi functional peripheral is Internet-connected via the portable telephone. On the operation screen 400, it is permitted to input an Internet address by use of the operation panel 83. The operation panel 400 is displayed on the display section 93 by touching the Internet button 352 on the setting screen 350 shown in FIG. 32. On the operation screen 400, an Internet address section 401, keyboard section 402 and return button 403 are displayed.

The Internet address section 401 displays guidance and has a display field 404 on which an address input by the user is displayed. On the keyboard section 402, alphabets and symbols are arranged in substantially the same form as in the keyboard of a normal PC. The alphabets and symbols displayed on the keyboard section 402 can be input by use of the touch panel 93a.

The keyboard shown in FIG. 35 is shown as an example, and the alphabets and symbols displayed and the arrangement thereof can be made different from the display example shown in FIG. 35. The return button 403 is selected to return the screen to the setting screen 350 shown in FIG. 32.

The alphabets and symbols input by operating the keyboard section 402 are displayed on the address display field 404. For example, each time one of the alphabets and symbols displayed on the keyboard section 402 is touched, the touched character is displayed on the address display field 404. If the user is satisfied with an address displayed on the address display field 404, the user touches an "enter" key of the keyboard section 402. Thus, input of an address (which is an address of the Web page of the connection destination) displayed on the address display field 404 is terminated.

Figure 36:
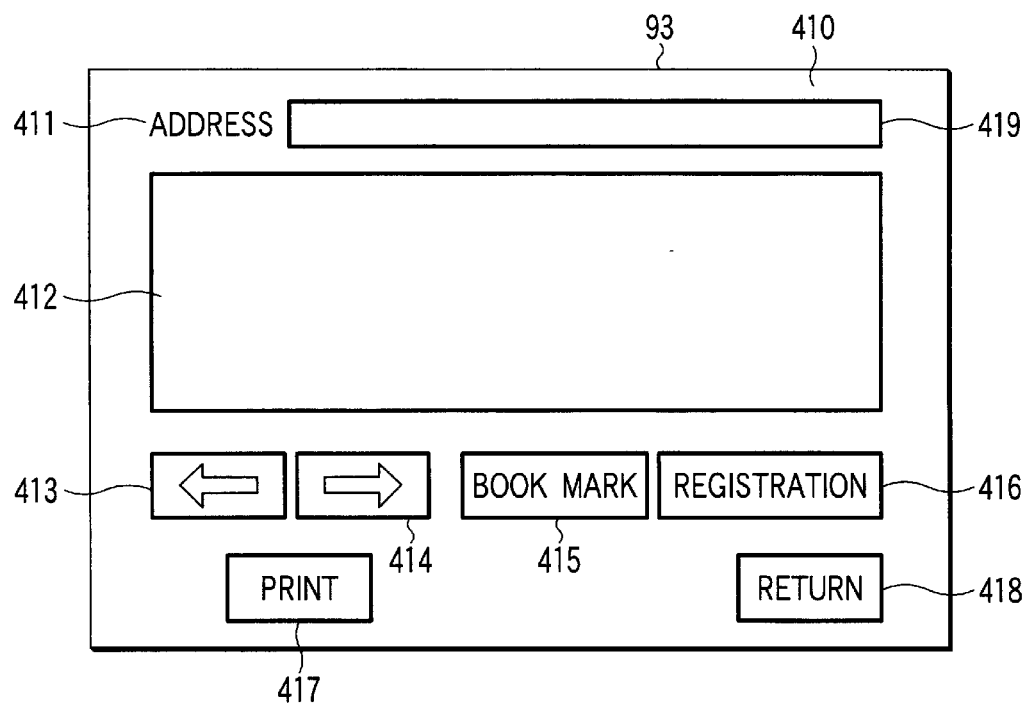
FIG. 36 is a view showing a display example of a display screen when a Web page is displayed on the display section of the multi functional peripheral.

When input of the address of the Web page is terminated on the operation screen 400, a screen of the Web page is displayed on the display section 93. FIG. 36 shows an example of a display screen 410 when the Web page is displayed on the display section 93. The display screen 410 is an example in which the Web page of Internet accessed via the portable telephone is displayed. On the display screen 410, an Internet address section 411, display window 412, URL return button 413, URL proceeding button 414, book mark button 415, registration button 416, printing button 417 and return button 418 are displayed.

On the Internet address section 411, guidance display is made and an address display field 419 is displayed. On the address display field 419, the address of the Web page displayed on the display window 412 is displayed. On the display window 412, the Web page of the address displayed on the address display field 419 is displayed.

The URL return button 413 is specified to return the Web pages which have been displayed so far for each page. If the URL return button 413 is touched, each of the Web pages which have been displayed so far is displayed while each page is returned to the preceding page. The URL proceeding button 414 is specified to cause the page returned by use of the URL return button 413 to proceed to the former or original page which was set before the page was returned. If the URL proceeding button 414 is touched, the page proceeds to the former page from the page returned by use of the URL return button 413 and is displayed on the display section 93. That is, if the URL proceeding button 414 is touched, each page is turned over in a direction opposite to the direction in which the page is returned by use of the URL return button 413 and the Web page is displayed.

The book mark button 415 is specified when the title and URL of the Web page registered in the portable telephone as the book mark are displayed on the Web page display window 412. For example, when the book mark button 415 is touched, the title or URL of the Web page registered in the portable telephone as the book mark is displayed on the display section 93. If the user touches a desired Web page based on the displayed title or URL of the Web page, the touched Web page is displayed on the display window 412.

The registration button 416 is specified when the Web page displayed on the display window 412 is registered into the portable telephone as the book mark. If the registration button 416 is touched, the address or URL of the Web page displayed on the display window 412 is registered into the portable telephone as the book mark.

The printing button 417 is specified so as to cause the multi functional peripheral to print an image of the Web page displayed on the display window 412. If the printing button 417 is touched, an image of the Web page displayed on the display window 412 is printed by the printer section 86 of the multi functional peripheral. The return button 418 is specified to return the screen to the setting screen 350 shown in FIG. 32. When the return button 418 is touched, the setting screen 350 shown in FIG. 32 is displayed on the display section 93.

Figure 37:
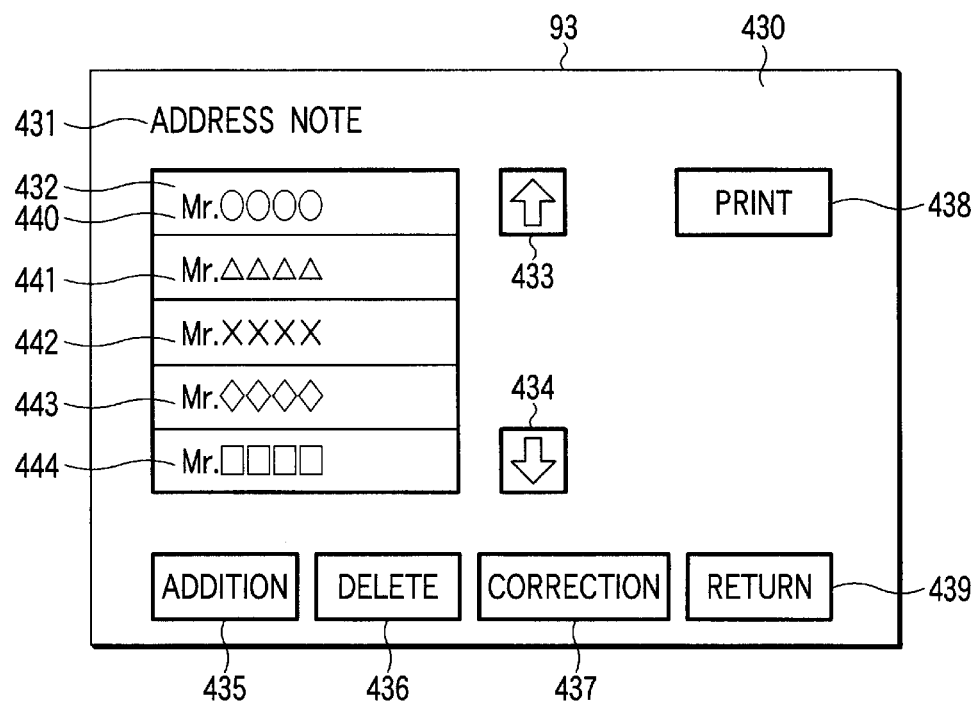
FIG. 37 is a view showing a display example of an edition screen displayed on the display section of the multi functional peripheral when the address note of the portable telephone is edited by use of the multi functional peripheral.

Next, a case wherein the address note stored in the portable telephone is arranged by use of the operation panel 83 of the multi functional peripheral is explained. FIG. 37 shows a display example of an edition screen 430 displayed on the display section 93 when the address note stored in the portable telephone is arranged. The edition screen 430 is displayed on the display section 93 when the address note arranging button 354 is touched on the setting screen 350 shown in FIG. 32.

On the edition screen 430, an address note character string section 431, address note display window 432, upward button 433, downward button 434, addition button 435, delete button 436, correction button 437, printing button 438 and return button 439 are displayed.

On the address note character string section 431, a character string indicating that the address note is displayed is displayed. On the address note display window 432, information registered in the address note is displayed. The upward button 433 is specified when information displayed on the display window 432 is scrolled in the upward direction. The downward button 434 is specified when information displayed on the display window 432 is scrolled in the downward direction. The addition button 435 is specified when information is added in the address note. The delete button 436 is specified when information registered in the address note is deleted. The correction button 437 is specified when information registered in the address note is corrected. The printing button 438 is specified when information displayed on the display window 432 is printed by the multi functional peripheral. The return button 439 is specified when the screen displayed on the display section 93 is returned to the preceding screen.

On the edition screen 430 shown in FIG. 37, information items of five persons are displayed on the display window 432. Information displayed on the display window 432 can be scrolled and displayed when the user touches the upward button 433 or downward button 434. On the edition screen 430 shown FIG. 37, information items of "MR. ○○○○" 440, "MR. △△△△" 441, "MR. X X X X" 442, "MR. ◇◇◇◇" 443, "MR. □□□□" 444 are displayed on the display window 432.

When the process for correcting, deleting, printing information displayed on the display window 432 is effected, the user touches a portion on which information to be processed is displayed. As a result, the touched display portion is reversedly displayed to indicate that it is set into the selected state. For example, when information of Mr. X X X X displayed in the third position on the edition screen 430 shown in FIG. 37 is selected, the user touches a portion on which "MR. X X X X" 442 is displayed. As a result, the display portion of "MR. X X X X" 442 is reversedly displayed to indicate that it is set into the selected state.

When new information is added in the address note of the portable telephone, the user selects the addition button. When the addition button 435 is touched, a screen (not shown) used for inputting information to be added is displayed on the display section 93. While added information to be input is being displayed, the user inputs information to be added. When inputting of information to be added is terminated, the input information is added in the address note of the portable telephone. As a result, the added information is displayed on the display window 432.

When information registered in the address note of the portable telephone is deleted, the user selects the delete button while information to be deleted is being selected. When the delete button 436 is touched while the information is being selected on the display window 432, the selected information is deleted from the address note of the portable telephone. As a result, the deleted information is not displayed on the display window 432.

When information registered in the address note of the portable telephone is corrected, the user selects the correction button 437 while information to be corrected is being selected. When the correction button 437 is touched while the information is being selected on the display window 432, a screen (not shown) used for correcting the selected information is displayed on the display section 93. If the process for correcting the selected information on the correcting screen is terminated, the corrected information is registered in the address note of the portable telephone. As a result, the corrected information is displayed on the display window 432.

When the contents of the address note are printed by the printer section 68 of the multi functional peripheral, the user selects the printing button 438. In this case, it is possible to print the whole information registered in the address note or print only selected information. For example, when the printing button 438 is touched while information is not selected at all on the edition screen 430 shown in FIG. 37, whole information is printed, and when the printing button 438 is touched while part of the information is selected, only the selected information is printed. When the return button 439 is touched, the setting screen shown in FIG. 32 is displayed on the display section 93.

Next, a case wherein the calling tone of the portable telephone is set by use of the operation panel of the multi functional peripheral is explained.

In most of the recent portable telephones, a calling tone can be independently set for the user. This makes it possible to easily distinguish the portable telephone from another portable telephone by sounding his own calling tone and the user will be satisfied by setting the calling tone which he likes. However, in the conventional portable telephone, the number of operable keys is small and it is difficult to set an original calling tone and change the calling tone. In this example, a case wherein the process for changing the calling tone and setting the original calling tone can be easily effected in the portable telephone by using the operation panel of the multi functional peripheral is explained.

FIG. 37 shows a display example of a setting screen 450 displayed on the display section 93 when a calling tone of the portable telephone to which connection is set up is set. The setting screen 450 is displayed on the display section 93 when the calling tone setting button 355 is touched on the setting screen 350 shown in FIG. 32. On the setting screen 450, a guidance display section 451, display window 452, upward button 453, downward button 454, selection button 455, self-making button 456, printing button 457 and return button 458 are displayed.

On the guidance display section 451, a character string indicating that the screen is a setting screen used for setting a calling tone of the portable telephone is displayed. On the display window 452, a plurality of patterns of calling tones registered in the portable telephone are displayed so as to be selected. The upward button 453 is specified when information displayed on the display window 452 is scrolled in the upward direction. The downward button 454 is specified when information displayed on the display window 452 is scrolled in the downward direction. The selection button 455 is specified when one of the patterns of the calling tones displayed on the display window 452 is selected. The self-making button 456 is specified when a calling tone is created by himself. The printing button 457 is specified when the patterns of the calling tones displayed on the display window 452 are printed on the multi functional peripheral side. The return button 458 is specified when the screen displayed on the display section 93 is returned to the preceding screen.

Figure 38:
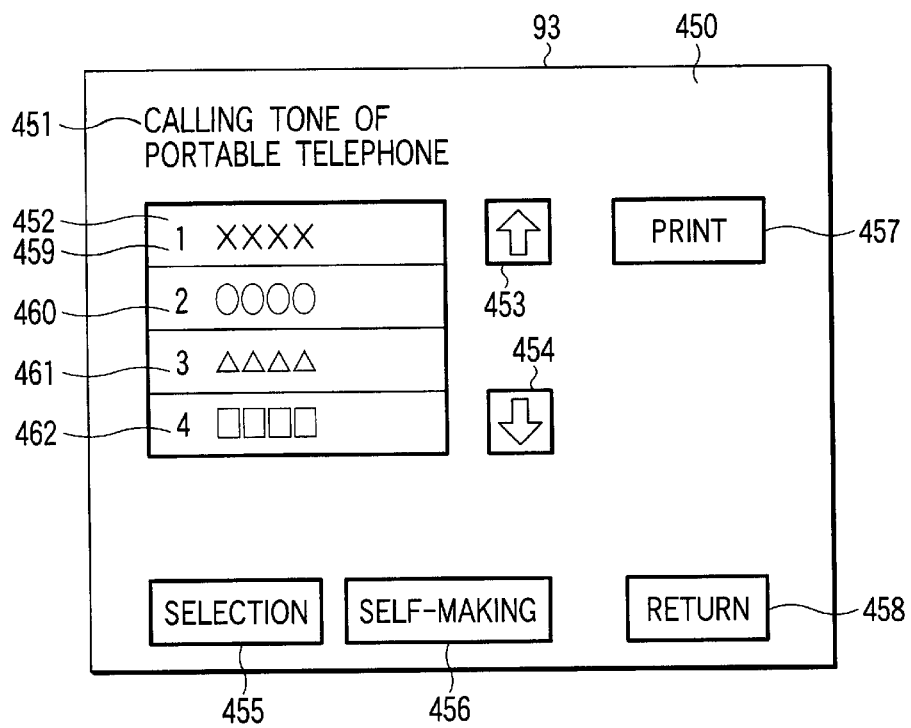
FIG. 38 is a view showing a display example of a setting screen displayed on the display section of the multi functional peripheral when a calling tone of the portable telephone is set by use of the multi functional peripheral.

On the setting screen 450 shown in FIG. 38, titles as four patterns of the calling tones are displayed on the display window 452. By permitting the user to touch the upward button 453 or downward button 454, it becomes possible to scroll and display information displayed on the display window 452. In the setting screen 450 shown in FIG. 38, the titles of "X X X X" 459, "○○○○" 460, "ΔΔΔΔ" 461, "□□□□" 462 are displayed on the display window 452.

When the title is selected as the pattern of the calling tone displayed on the display window 452, the user touches a portion on which the title of the pattern of the calling tone to be selected is displayed. As a result, the touched display portion is reversedly displayed to indicate that it is set into the selected state. For example, when "ΔΔΔΔ" 461 displayed in the third position on the setting screen 450 shown in FIG. 38 is selected, the user touches a portion on which "ΔΔΔΔ" 461 is displayed. As a result, the display portion of "ΔΔΔΔ" 461 is reversedly displayed to indicate that it is set into the selected state. When a calling tone is set based on the title displayed on the display window 461, the user touches the selection button 455 while only one of the titles is being selected. Thus, the pattern of the calling tone of the selected title is set as a calling tone of the portable telephone.

If the user creates the pattern of a new calling tone by himself, he touches the self-making button 456. When the self-making button 456 is touched, an input screen (which will be described later) used for inputting a self-making melody is displayed on the display section 93. If part of the calling tone of the title displayed on the display window 461 is modified, the user touches the self-making button 456 while the title is being selected.

When the titles of the patterns of calling tones are printed in a list form, the user touches the printing button 457. If the printing button 457 is touched, the list is printed by the printer section 86 of the multi functional peripheral. It is also possible to print the pattern of the selected calling tone by touching the printing button 457 while the pattern of the calling tone is being selected. When the return button 458 is touched, the setting screen 350 shown in FIG. 32 is displayed on the display section 93.

Next, a melody self-registering process is explained.

Figure 39:
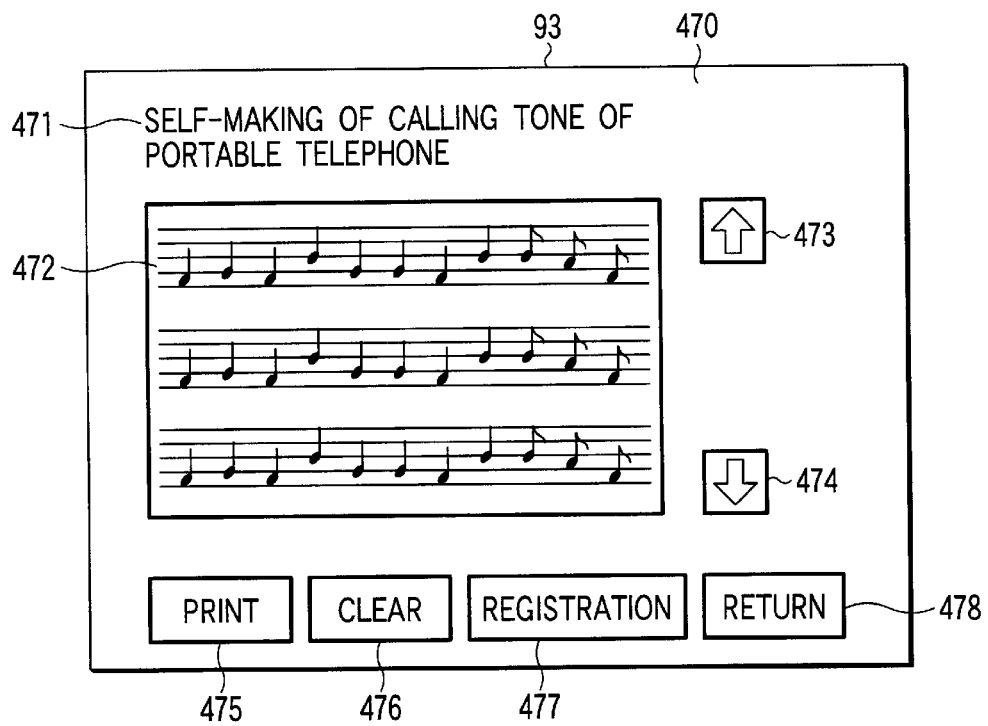
FIG. 39 is a view showing a display example of an input screen displayed on the display section of the multi functional peripheral when a calling tone is created by use of the multi functional peripheral.

When the self-making button 456 is touched on the setting screen 450 shown in FIG. 38, an input screen 470 shown in FIG. 39 is displayed on the display section 93. On the input screen 470, it is permitted to input a self-making melody in a musical score form. When the self-making button 456 is touched while the title is being selected, the calling tone of the registered title is displayed in a musical score form on the input screen 470. In this case, the registered calling tone can be corrected and a new calling tone can be made by correcting the musical score displayed on the display section 93.

On the input screen 470, a guidance display section 471, display window 472, upward button 473, downward button 474, printing button 475, clear button 476, registration button 477 and return button 478 are displayed.

On the guidance display section 471, a character string indicating that the self-created pattern of the calling tone of the portable telephone is displayed is displayed. On the display window 472, a staff with plural columns is displayed and musical notes input by the user are displayed on the staff. The upward button 473 is specified to scroll information displayed on the display window 472 in the upward direction. The downward button 474 is specified to scroll information displayed on the display window 472 in the downward direction. The printing button 475 is specified to print the self-created musical score displayed on the display window 472. The clear button 476 is specified to clear information displayed on the display window 472. The registration button 477 is specified to register the pattern of a calling tone displayed on the display window 472. The return button 478 is specified to return the screen to the preceding screen which was displayed on the display section 93.

On the input screen 470 shown in FIG. 39, the staff with three columns is displayed on the display window 472. The screen displayed on the display window 472 is scrolled by touching the upward button 473 or downward button 474 and displayed. When a musical score is self-created on the input screen 470, the pattern of a calling tone can be input by use of a normal portable telephone by using a ten-key pad as the hard key pad 94 or by using the touch panel 93a of the display section 93. For example, when the pattern is input by using the touch panel 93a, the user first touches a position of the staff in which a musical note is input and then selects one of the types of the musical notes from a list of musical notes displayed. Since the operation panel 83 of the multi functional peripheral has the touch panel 93a, it can provide various input operation methods for user's convenience.

When the printing button 475 is touched, the musical scores displayed on the display window 472 are all printed by the printer section 86 of the multi functional peripheral. When the clear button 476 is touched, information displayed on the display window 472 is cleared. When the registration button 477 is touched, the pattern of the calling tone displayed on the display window 472 is registered in the portable telephone. At this time, the self-created pattern of the calling tone is registered with a title given by the user or a title automatically given by the multi functional peripheral. As a result, the self-created pattern of the calling tone is displayed in the form of the title given at the registration time on the display window 452 of the setting screen 450. When the return button 478 is touched, the setting screen 450 shown in FIG. 38 is displayed on the display section 93.

Next, a case wherein various settings of the portable telephone are changed by using the operation panel of the multi functional peripheral is explained. FIG. 40 shows a display example of a setting changing screen 490 used for changing various settings of the portable telephone to which connection is set up by use of the operation panel 83. The setting changing screen 490 is displayed on the display section 93 when the setting changing button 356 is touched on the setting screen 350 shown in FIG. 32. The setting contents of the portable telephone to which connection is set up can be changed on the setting changing screen 490.

On the setting changing screen 490, a guidance display section 491, received sound volume adjusting section 492, calling tone volume adjusting section 493, answer-phone setting section 494, number notification setting section 495, printing button 496, application button 497 and return button 498 are displayed. The setting changing screen 490 is displayed depending on the portable telephone. For example, if setting items other than the setting items shown in FIG. 40 are present in the portable telephone, the setting changing screen 490 is so displayed that the setting items can also be set.

On the guidance display section 491, a character string indicating that the setting changing screen of the portable telephone is displayed is displayed. The received sound volume adjusting section 492 is used for adjusting the received sound volume of the portable telephone in communication. The calling tone volume adjusting section 493 is used for adjusting the volume of a calling tone of the portable telephone. The answer-phone setting section 494 is used for setting an answer-phone function of the portable telephone. The number notification setting section 495 is used for setting whether or not the telephone number of the transmission source is notified to the transmission destination by use of the portable telephone. The printing button 496 is specified when the display contents of the setting changing screen 490 are printed. The application button 497 is specified when the contents set by the received sound volume adjusting section 492, calling tone volume adjusting section 493, answer-phone setting section 494 and number notification setting section 495 are made effective. The return button 498 is specified when the screen displayed on the display section 93 is returned to the preceding screen.

The received sound volume adjusting section 492 includes a setting value field 499, UP button 500 and DOWN button 501. The setting value field 499 indicates the present set value of the received sound volume. The UP button 500 is specified to increase the set value displayed in the setting value field 499. The DOWN button 501 is specified to decrease the set value displayed in the setting value field 499. In the setting value field 499, the value of the received sound volume which is now set is displayed in a numerical form. The setting changing screen 490 shown in FIG. 40 indicates that the received sound volume is set at the level "5" among the six levels. That is, each time the UP button 500 is touched, the level of the received sound volume is raised by one. Further, each time the Down button 501 is touched, the level of the received sound volume is lowered by one.

The calling tone volume adjusting section 493 includes a setting value field 502, UP button 503 and DOWN button 504. The setting value field 502 indicates the present set value of the calling tone volume. The UP button 503 is specified to increase the set value displayed in the setting value field 502. The DOWN button 501 is specified to decrease the set value displayed in the setting value field 502. In the setting value field 502, the value of the calling tone volume which is now set is displayed in a numerical form. The setting changing screen 490 shown in FIG. 40 indicates that the calling tone volume is set at the level "5" among the six levels. That is, each time the UP button 502 is touched, the level of the calling tone volume is raised by one. Further, each time the Down button 503 is touched, the level of the calling tone volume is lowered by one.

The answer-phone setting section 494 includes an ON button 505 and OFF button 506. Only one of the ON button 505 and OFF button 506 can be selected. One of the ON button 505 and OFF button 506 which is selected is reversedly displayed. In the example shown in FIG. 40, the ON button is selected. If the ON button is thus selected, the answer-phone function is effective in the portable telephone connected to the multi functional peripheral.

The number notification setting section 495 includes an ON button 507 and OFF button 508. The ON button 507 is selected when the number notification is made. The OFF button 508 is selected when the number notification is not made. Only one of the ON button 507 and OFF button 508 can be selected. One of the ON button 507 and OFF button 508 which is selected is reversedly displayed. In the example shown in FIG. 40, the ON button 507 is selected. If the ON button 507 is thus selected, the number notification is set to be effective in the portable telephone connected to the multi functional peripheral and the telephone number of the portable telephone is notified to the transmission destination.

If the printing button 496 is touched, the contents set on the setting changing screen 490 are printed by the printer section 86 of the multi functional peripheral. If the application button 497 is touched, the contents changed on the setting changing screen 490 are notified to the portable telephone and the settings of the portable telephone are actually changed. When the return button 498 is touched, the setting screen 350 shown in FIG. 32 is displayed on the display section 93.

Next, the rule DB 107 stored in the server 100 shown in FIG. 9 is explained by taking a simple case as an example. A large number of types of multi functional peripherals which can be used in the image processing system with the construction as shown in FIGS. 1 to 4 are manufactured in many different manufacturing companies. In the multi functional peripherals, the sizes of the display sections 93 of the operation panels 83 are different in many cases. Further, items which can be set by the operations of the operation panels 83 may be different in some cases. In addition, the levels of the values such as densities which can be set in the multi functional peripherals may be different in some cases. A rule for setting the set values of the different types of multi functional peripherals to set values which are as close to each other as possible is previously stored in the rule DB 107. Further, a rule for permitting the operations effected on the screens shown in FIGS. 32 to 40 to be performed by effecting similar operations is also stored in the rule DB 107.

For example, the rule DB 107 is explained by taking the color adjustment as an example. FIGS. 41 and 42 show display examples of adjusting screens used for adjusting color in different multi functional peripherals. In this example, FIG. 41 shows an adjusting screen 520 used for adjusting color in a multi functional peripheral (which is the type A) and FIG. 42 shows an adjusting screen 521 used for adjusting color in a multi functional peripheral (which is the type B) different from the type A. In the adjusting screens 520, 521, the densities of four colors, yellow, magenta, cyan and black can be set.

In the adjusting screen 520, yellow, magenta, cyan and black are displayed in five levels. Therefore, four colors of yellow, magenta, cyan and black can be adjusted in five levels in the adjusting screen 520. On the other hand, in the adjusting screen 521, yellow, magenta, cyan and black are displayed in eleven levels. Therefore, four colors of yellow, magenta, cyan and black can be adjusted in eleven levels in the adjusting screen 521.

The adjusting screens 520 and 521 are compared with each other. For example, if the level of yellow is raised by one level in the type A on the adjusting screen 520 and when the adjustment of the color tone is applied to the type B, the color tone attained by raising the level of yellow by three levels, lowering the level of magenta by one level and lowering the level of cyan by one level is closest to the color tone obtained on the adjusting screen 520. Thus, if the levels of setting values are different depending on the types and when the adjustment made in one type is applied to another type different from the former type, a rule for applying the setting value of the former type to the latter type becomes necessary. The rule depends on the types and it is possible to previously determine the correspondence relation between the setting values of the different types. That is, in the rule DB 107, a rule indicating the correspondence relation of the setting values depending on the types is stored. By referring to the rule stored in the rule DB 107, setting (adjustment) made for a certain type can be applied to another type.

Therefore, in a case where different types are present on the image processing system, setting for each user can be reflected by use of a data base storing the correspondence relation of the setting values of the different types even if the user uses any one of the types.

Next, exchange of information between the portable telephone, multi functional peripheral and server is explained by use of the event diagram.

First, exchange of information effected until connection between the portable telephone 51 and the multi functional peripheral A 52 is set up in the first connection method is explained. As shown in FIG. 5, in the first connection method, connection to the multi functional peripheral which is a connection destination specified by the portable telephone 51 is made. In the portable telephone 51, the multi functional peripheral A 52 of the connection destination is specified on the selection screen used for selecting the multi functional peripheral of connection destination as shown in FIG. 12.

FIG. 43 is an event diagram showing events occurring until connection between the portable telephone 51 and the multi functional peripheral A 52 is set up in the first connection method. In the event diagram shown in FIG. 43, events after the connection is set up are not shown.

First, in the portable telephone 51, when connection to the multi functional peripheral is specified on the menu screen 120 as shown in FIG. 11, the multi functional peripheral selection screen 130 as shown in FIG. 12 is displayed on the display section 113. If an MFP number (device number) indicating the multi functional peripheral A 52 is input and the OK button 133 is specified on the multi functional peripheral selection screen 130, the portable telephone 51 transmits a connection request signal to the multi functional peripheral (S1000). The multi functional peripheral which has received the connection request signal transmits an ACK signal indicating permission of connection to the portable telephone 51 (S1001) if the portable telephone 51 is set in a connectable state. The portable telephone 51 which has received the ACK signal indicating permission of connection transmits a signal for confirming the device number given to the multi functional peripheral A 52 to the multi functional peripheral of transmission source of the ACK signal (S1002). The multi functional peripheral which has received the signal for confirming the device number determines whether the received device number is correct or not by comparing the received device number with its own device number. As the result of determination, the multi functional peripheral A 52 which determines that the received device number is correct transmits an ACK signal indicating that it is the multi functional peripheral of the specified device number to the portable telephone 51 (S1003).

The portable telephone 51 which has received the ACK signal transmits user information (individual authentication information) as information such as a telephone number for identifying the individual to the multi functional peripheral A 52 (S1004). Generally, the portable telephone has user information (individual authentication information) as information such as a telephone number for identifying the individual. In this example, it is assumed that the user information includes a telephone number, user's name, user ID and the like.

Next, when receiving the user information from the portable telephone 51, the multi functional peripheral A 52 transmits an ACK signal indicating that it has received the user information to the portable telephone 51 (S1005). At this time, the multi functional peripheral A 52 displays the password input screen 260 as shown in FIG. 25 on the display screen 93. On the password input screen 260, the user inputs a password and specifies the OK button 264. Then, the multi functional peripheral A 52 transmits a signal for authentication containing the password input by the user to the portable telephone 51 (S1006). At this time, the multi functional peripheral encodes the signal by use of SSL so that the password cannot be known by others and transmits the signal. The portable telephone 51 having received the authentication signal transmits an ACK signal indicating that it has received the authentication signal to the multi functional peripheral A 52 (S1007). Further, in the portable telephone 51, the received authentication signal coded by use of SSL is decoded and collation is made to determine whether the password is correct or not. The portable telephone 51 transmits a signal indicating that the password is correct or not based on the password collation result to the multi functional peripheral A 52 (S1008). If the signal from the portable telephone 1 is a signal indicating that the password is correctly collated, the multi functional peripheral A 52 transmits an ACK signal indicating that connection is set up to the portable telephone 51 (S1009). By exchange of the above information items, connection between the portable telephone 51 and the multi functional peripheral A 52 is set up.

As described above, in the first connection method, the multi functional peripheral of connection destination is specified by the portable telephone and then connection between the specified multi functional peripheral and the portable telephone is made. As a result, the process for connection to the multi functional peripheral to which the user wants to connect the portable telephone can be efficiently effected.

Further, the password used for authentication of the user is input on the multi functional peripheral side, encoded by use of SSL and transmitted from the multi functional peripheral to the portable telephone. The collation process of the password is effected not in the multi functional peripheral but in the portable telephone. As a result, a system with extremely high secrecy can be realized.

Next, exchange of information effected until connection between the portable telephone 61 and the multi functional peripheral A 62 is set up by use of the second connection method is explained. As shown in FIG. 6, in the second connection method, multi functional peripherals transmit broadcast signals and the portable telephone 61 which has received the broadcast signals selects a multi functional peripheral to be connected.

FIG. 44 is an event diagram showing events occurring until connection between the portable telephone 61 and the multi functional peripheral A 62 is set up by use of the second connection method. In the event diagram shown in FIG. 44, events after the connection is set up are not shown.

A broadcast signal is transmitted from each multi functional peripheral. In this state, the portable telephone 61 selects the connection mode for connection with a multi functional peripheral on the menu screen 160 shown in FIG. 15. Then, the portable telephone 61 receives the broadcast signals from the multi functional peripherals. As a result, the portable telephone 61 displays the selection screen 170 displaying a list of available multi functional peripherals as shown in FIG. 16 on the display screen 113 based on the received broadcast signals. The user selects a multi functional peripheral to be used from the list.

In this case, it is assumed that the broadcast signal is also transmitted from the multi functional peripheral A 62 to which the user wants to connect the portable telephone (S1100). At this time, a list of multi functional peripherals including the multi functional peripheral A 62 is displayed on the selection screen 170. The user selects the multi functional peripheral A 62 from the list and specifies the OK button 175. Then, the portable telephone 61 transmits a connection request signal including a device number to the multi functional peripheral A 62 (S1101). The multi functional peripheral A 62 which has received the connection request signal transmits an ACK signal indicating that it has received the connection request signal to the portable telephone 61 (S1102).

The portable telephone 61 which has received the ACK signal transmits user information which is information for identifying an individual to the multi functional peripheral A 62 (S1103). Like the above case, in this case, it is assumed that the portable telephone 61 has information such as a telephone number for identifying the individual. In this example, the user information includes a telephone number, user's name, user ID and the like.

The multi functional peripheral A 62 which has received the user information from the portable telephone 61 transmits an ACK signal indicating that it has received the user information to the portable telephone 61 (S1104). At this time, the multi functional peripheral A 62 displays the password input screen 260 used for suggesting that a password is input as shown in FIG. 25 on the display screen 93. On the password input screen 260, the user inputs a password and specifies the OK button 264. Then, the multi functional peripheral A 62 transmits a signal for authentication containing the password input by the user to the portable telephone 61 (S1105). At this time, like the first connection method, communication is made by use of SSL so that the password cannot be known by others.

The portable telephone 61 having received the authentication signal transmits an ACK signal indicating that it has received the authentication signal to the multi functional peripheral A 62 (S1106). Further, the portable telephone 61 decodes the password from the received authentication signal and effects a collation process for determining whether the password is correct or not. The portable telephone transmits a signal containing the collation result indicating that the password is correct or not based on the password collation result to the multi functional peripheral A 62 (S1107).

When receiving a signal indicating that the password is correctly collated from the portable telephone 61, the multi functional peripheral A 62 transmits an ACK signal indicating that connection is set up to the portable telephone 61 (S1109). By exchange of the above information items, connection between the portable telephone 61 and the multi functional peripheral A 62 is set up.

As described above, in the second connection method, the portable telephone receives the broadcast signals transmitted from the multi functional peripherals and selects a multi functional peripheral to be connected from the multi functional peripherals which can be used by the portable telephone based on the received broadcast signals. Thus, since the user can select one of the available multi functional peripherals and connect the portable telephone to the selected multi functional peripheral without fail, the usability for the user can be enhanced.

Further, like the first connection method, in the second connection method, the collation process for the password input on the multi functional peripheral side for authenticating the user is effected in the portable telephone after the password is encoded by use of SSL and transmitted from the multi functional peripheral to the portable telephone. As a result, a system with extremely high secrecy can be realized.

Next, exchange of information effected until connection between the portable telephone 61 and the multi functional peripheral A 62 is set up by use of the fourth connection method is explained. Unlike the second connection method, in the fourth connection method, multi functional peripherals do not transmit broadcast signals. In the fourth connection method, the portable telephone transmits a broadcast signal inquiring that the multi functional peripheral is available or not to each multi functional peripheral. Each multi functional peripheral transmits a signal indicating that it can be connected in response to the broadcast signal from the portable telephone 61 and is tentatively connected to the portable telephone 61. If the portable telephone 61 selects a multi functional peripheral to be connected from the multi functional peripherals which are tentatively connected, formal connection between the portable telephone 61 and the multi functional peripheral A 62 is set up.

Figure 45:
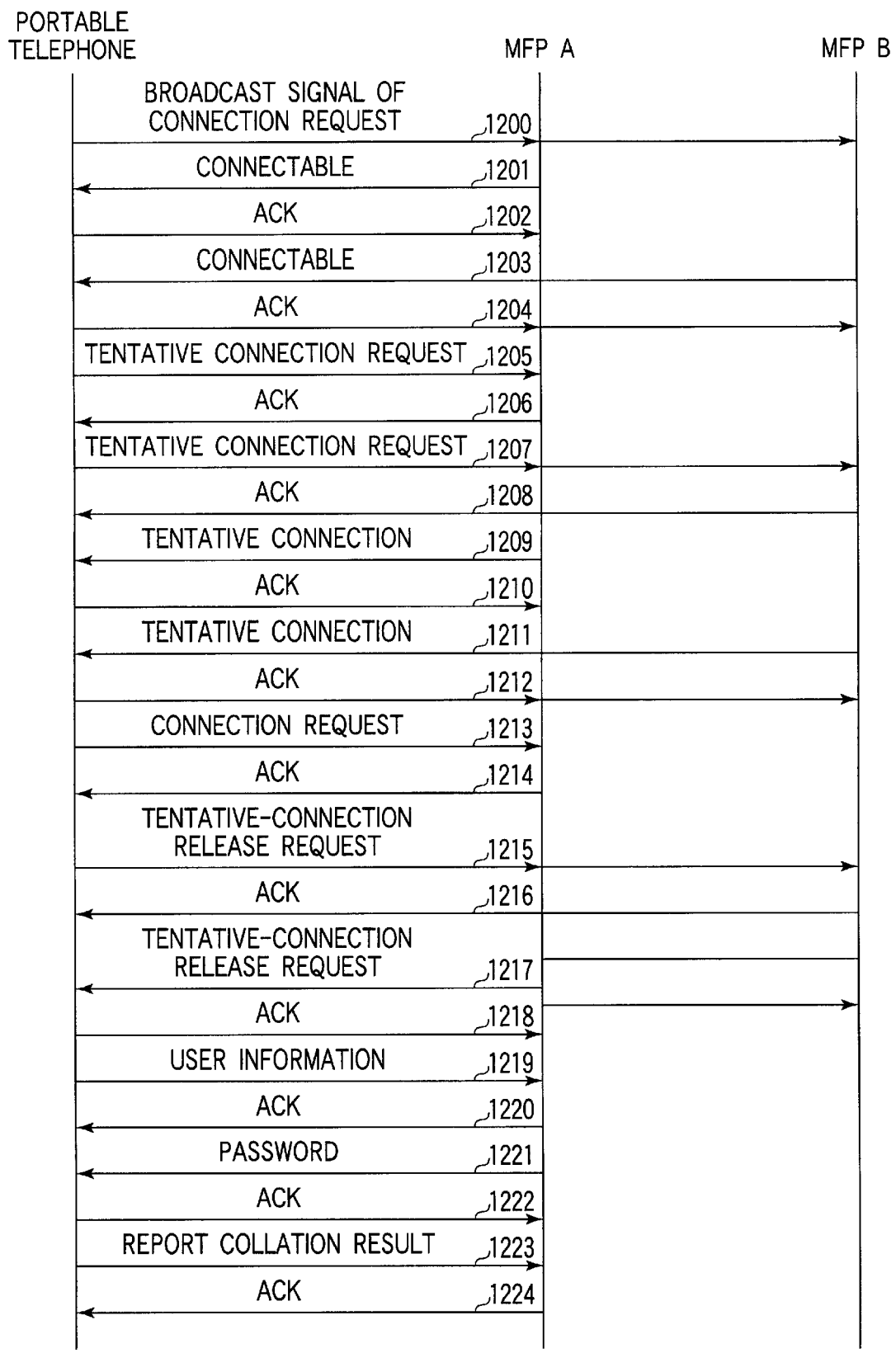
FIG. 45 is an event diagram for illustrating transmission/reception of information until connection between the multi functional peripheral and the portable telephone is set up by the fourth connection method.

FIG. 45 is an event diagram showing events occurring until connection between the portable telephone 61 and the multi functional peripheral A 62 is set up by use of the fourth connection method. In the event diagram shown in FIG. 45, events after the connection is set up are not shown.

A connection mode for connection with a multi functional peripheral is selected on the menu screen 220 shown in FIG. 21 in the portable telephone 61. Then, the portable telephone 61 transmits a broadcast signal for connection request to multi functional peripherals (S1200).

When receiving the broadcast signal from the portable telephone 61, each multi functional peripheral determines whether it can be connected to the portable telephone 61 or not. The multi functional peripheral which has determined that it can be connected to the portable telephone 61 transmits a signal indicating that it can be connected to the portable telephone 61 (S1201, S1203). For example, in the example shown in FIG. 45, signals indicating that the multi functional peripherals can be connected are transmitted from the multi functional peripheral A 62 and the multi functional peripheral B 63 to the portable telephone 61.

When receiving the signal indicating that the multi functional peripheral can be connected from the multi functional peripheral A 62 (S1201), the portable telephone 61 transmits an ACK signal indicating that the signal indicating the connectable state of the multi functional peripheral has been received to the multi functional peripheral A 62 (S1202). Likewise, when receiving the signal indicating that the multi functional peripheral can be connected from the multi functional peripheral B 63 (S1203), the portable telephone 61 transmits an ACK signal indicating that the signal indicating the connectable state of the multi functional peripheral has been received to the multi functional peripheral B 63 (S1204).

Next, the portable telephone 61 which has received the signal indicating that the multi functional peripheral can be connected from the multi functional peripheral A 62 transmits a signal containing a tentative connection request to the multi functional peripheral A 62 (S1205). The multi functional peripheral A 62 which has received the tentative connection request transmits an ACK signal indicating that it has received the signal containing the tentative connection request to the portable telephone 61 (S1206). Likewise, the portable telephone 61 which has received the signal indicating that the multi functional peripheral can be connected from the multi functional peripheral B 63 transmits a signal containing a tentative connection request to the multi functional peripheral B 63 (S1207). The multi functional peripheral B 63 which has received the tentative connection request transmits an ACK signal indicating that it has received the signal containing the tentative connection request to the portable telephone 61 (S1208).

Further, the multi functional peripheral A 62 which has received the tentative connection request transmits a signal containing a tentative connection code indicating that the tentative connection is satisfactorily made to the portable telephone 61 (S1209). The portable telephone 61 which has received the above signal transmits an ACK signal indicating that the signal containing the tentative connection code is received to the multi functional peripheral A 62 (S1210). Likewise, the multi functional peripheral B 63 which has received the tentative connection request transmits a signal containing a tentative connection code indicating that the tentative connection is satisfactorily made to the portable telephone 61 (S1211). The portable telephone 61 which has received the above signal transmits an ACK signal indicating that the signal containing the tentative connection code is received to the multi functional peripheral B 63 (S1212).

By the process described so far, the multi functional peripheral selection screen 230 shown in FIG. 22 is displayed on the display section 113 of the portable telephone 61. If the user selects the multi functional peripheral A 62 on the selection screen 230, the portable telephone 61 transmits a connection request signal to the multi functional peripheral A 62 (S1213). The multi functional peripheral A 62 which has received the connection request signal transmits an ACK signal indicating that it has received the connection request signal to the portable telephone 61 (S1214).

If the multi functional peripheral A 62 is selected on the selection screen 230, the portable telephone 61 transmits a signal for requesting release of the tentative connection to the multi functional peripheral B 63 (S1215). The multi functional peripheral B 63 which has received the signal for requesting release of the tentative connection transmits an ACK signal indicating that it has received a release request of the tentative connection to the portable telephone 61 (S1216). Further, the multi functional peripheral B 63 which has received the signal for requesting release of the tentative connection from the portable telephone 61 releases the tentative connection with the portable telephone. When the tentative connection with the portable telephone is released, the multi functional peripheral B 63 transmits a signal reporting the release of the tentative connection indicating that the tentative connection with the portable telephone 61 is released to the portable telephone 61 (S1217). When receiving the signal reporting the release of the tentative connection from the multi functional peripheral B 63, the portable telephone 61 transmits an ACK signal indicating that it has received the above signal to the multi functional peripheral B 63 (S1218).

When the tentative connection with the multi functional peripheral other than the multi functional peripheral A 62 to be connected is released, the portable telephone 61 transmits user information which is information for identifying an individual to the multi functional peripheral A 62 (S1219). In this case, for example, the user information includes a telephone number of the portable telephone 61, user's name, user ID and the like. The multi functional peripheral A 62 which has received the user information from the portable telephone 61 transmits an ACK signal indicating that it has received the user information to the portable telephone 61 (S1220).

Further, the multi functional peripheral A 62 which has received the user information from the portable telephone 61 displays the password input screen 260 used for suggesting that a password is input as shown in FIG. 25 on the display screen 93. The user inputs a password according to the password input screen 260 displayed on the display section 93.

When the password is input on the password input screen 260, the multi functional peripheral A 62 transmits a signal for authentication containing the password input by the user to the portable telephone 61 (S1221). At this time, the signal for authentication transmitted from the multi functional peripheral A 62 to the portable telephone 61 is encoded by use of SSL and transmitted so that the password cannot be known by others. The portable telephone 61 having received the authentication signal transmits an ACK signal indicating that it has received the authentication signal to the multi functional peripheral A 62 (S1222). Further, the portable telephone 61 determines the password by decoding the authentication signal and effects a collation process for determining whether the password is correct or not. The portable telephone 61 transmits a signal containing information indicating that the password is correct or not based on the result of the collation process to the multi functional peripheral A 62 (S1223). The multi functional peripheral A 62 which has received the above signal transmits an ACK signal indicating that it has received the collation result to the portable telephone 61 (S1224). If the signal indicating that the password is correct is received as the collation result, the multi functional peripheral A 62 sets up connection with the portable telephone 61. By the above operation, connection between the portable telephone 61 and the multi functional peripheral A 62 is set up.

As described above, in the fourth connection method, the portable telephone transmits the broadcast signal inquiring whether the multi functional peripherals can be used or not and then selects a multi functional peripheral to be connected from the multi functional peripherals which transmit signals indicating that they can be used in response to the broadcast signal. Therefore, the available multi functional peripherals can be efficiently searched for and connection between the selected multi functional peripheral and the portable telephone can be made without fail.

Further, the portable telephone is tentatively connected to all of the multi functional peripherals that have transmitted signals indicating that they can be connected and selects a multi functional peripheral to be connected from the multi functional peripherals which are tentatively connected. When connection is set up between the selected multi functional peripheral and the portable telephone, the tentative connection with the multi functional peripherals other than the selected multi functional peripheral is released. Therefore, another user is prevented from connecting his telephone to the multi functional peripheral during the connecting process, no connection error occurs and the user can connect the portable telephone to the multi functional peripheral selected by the user without fail.

Further, like the first connection method, in the fourth connection method, the collation process for the password input on the multi functional peripheral side for authenticating the user is effected in the portable telephone after the password is encoded by use of SSL and transmitted from the multi functional peripheral to the portable telephone. Therefore, a system with extremely high secrecy can be realized.

Figure 46:
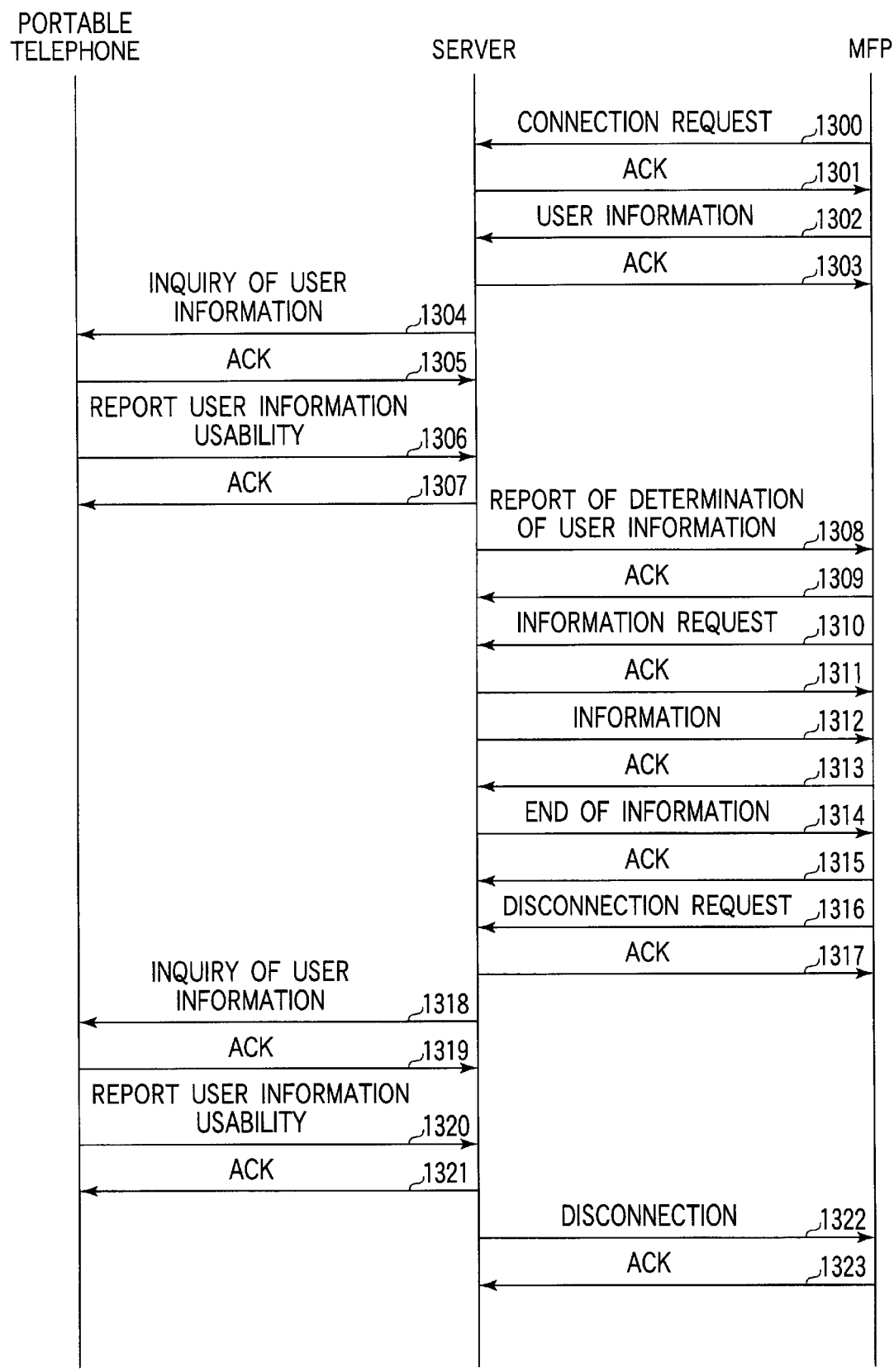
FIG. 46 is an event diagram for illustrating transmission/reception of information between the multi functional peripheral, server and portable telephone until the multi functional peripheral receives setting information associated with the user.

Next, a method for permitting the multi functional peripheral to acquire various information items from the server is explained. FIG. 46 is an event diagram for illustrating information transmitted/received between the multi functional peripheral, server and portable telephone when the multi functional peripheral receives setting information of each user stored in the server. In the following description, it is supposed that connection between the multi functional peripheral and the portable telephone is already set up. Transmission/reception of information as shown in FIG. 46 can be equally effected in any one of the first, second and third constructions shown in FIGS. 1, 2, 3 if three of the multi functional peripheral, server and portable telephone are connected to one another.

First, the multi functional peripheral transmits a connection request signal to the server (S1300). When receiving the request signal, the server transmits an ACK signal indicating that it has received the connection request signal to the multi functional peripheral (S1301). The multi functional peripheral which has received the ACK signal transmits user information which was acquired when connection with the portable telephone was set up to the server (S1302). When receiving the user information from the multi functional peripheral, the server transmits an ACK signal indicating that it has received the user information to the multi functional peripheral (S1303).

At this time, the server effects a process for determining whether the user information received from the multi functional peripheral is correct or not. The process is effected by causing the server to inquire of the portable telephone about the user information and acquire a reply with respect to the inquiry from the portable telephone.

That is, the server inquires the user information from the portable telephone corresponding to the user information received from the multi functional peripheral. In the inquiry process of the user information, the server inquires of the portable telephone as to whether or not connection thereof with the multi functional peripheral is now set up and whether or not it has transmitted the user information to the multi functional peripheral. If it is determined as the result of inquiry that the user information is correct, the server transmits setting information corresponding to the user information and stored in the user DB 109 to the multi functional peripheral. Thus, since the inquiry process of the user information is effected with respect to the portable telephone when the user information is received from the multi functional peripheral, dishonest access can be prevented and a system with high security can be realized.

As described above, when receiving the user information from the multi functional peripheral, the server transmits an inquiry signal of the user information to the portable telephone corresponding to the user information (S1304). When receiving the signal for inquiring the user information, the portable telephone transmits an ACK signal indicating that it has received the inquiry signal of the user information to the server (S1305). At this time, the portable telephone determines that the user information transmitted from the server is correct and that connection thereof with the multi functional peripheral is set up. Based on the determination result, the portable telephone transmits a user information usability reporting signal indicating that the user information can be used to the server (S1306).

The user information usability reporting signal is a signal indicating that the user information can be used when the user information is correct and connection with the multi functional peripheral is set up. The server having received the user information usability reporting signal from the portable telephone transmits an ACK signal indicating that the user information can be used to the portable telephone (S1307).

Further, when receiving the user information usability reporting signal from the portable telephone, the server transmits a user information determination reporting signal indicating that the user information can be used to the multi functional peripheral (S1308). The multi functional peripheral having received the user information determination reporting signal transmits an ACK signal indicating that it has received the determination reporting signal to the server (S1309).

Further, the multi functional peripheral having received the user information determination reporting signal is required to fetch setting information corresponding to the user information from the server. For this purpose, the multi functional peripheral transmits an information request signal for requesting setting information corresponding to the determined user information to the server (S1310).

The server having received the information request signal transmits an ACK signal indicating that it has received the information request to the multi functional peripheral (S1311). At this time, the server searches for setting information corresponding to the user information from the user DB 109 in response to the information request from the multi functional peripheral. The setting information corresponding to the user information obtained as the searching result is transmitted from the server to the multi functional peripheral (S1312). The multi functional peripheral having received the setting information from the server transmits an ACK signal indicating that it has received the setting information to the server (S1313).

When transmission of the setting information has been terminated, the server transmits an information termination signal indicating that the whole setting information has been completely transmitted to the multi functional peripheral (S1314). The multi functional peripheral having received the information termination signal transmits an ACK signal indicating that it has received the signal indicating the end of information transmission to the server (S1315). The multi functional peripheral having transmitted the ACK signal transmits a disconnection request signal for requesting release of connection with the server to the server (S1316).

The server having received the disconnection request signal transmits an ACK signal indicating that it has received the connection release request to the multi functional peripheral (S1317). Further, when receiving the disconnection request from the multi functional peripheral, the server re-confirms whether or not connection with the multi functional peripheral is still made. This is to enhance the security by causing the server to re-confirm whether connection between the portable telephone and the multi functional peripheral is still made or not.

For this purpose, the server transmits a user information inquiry signal to the portable telephone corresponding to the user information when it has received the user information from the multi functional peripheral (S1318). When receiving the signal for inquiring the user information, the portable telephone transmits an ACK signal indicating that it has received the user information inquiring signal to the server (S1319). At this time, the portable telephone determines that the user information transmitted from the server is correct and that connection with the multi functional peripheral is set up. Based on the determination result, the portable telephone transmits a user information usability reporting signal indicating that the user information can be used to the server (S1320).

The user information usability reporting signal is a signal indicating that the user information can be used when the user information is correct and connection with the multi functional peripheral is made. The server having received the user information usability reporting signal from the portable telephone transmits an ACK signal indicating that the user information can be used to the portable telephone (S1321).

Further, when receiving the user information usability reporting signal from the portable telephone, the server determines that the user information can be used and information transmitted to the multi functional peripheral is effective. After the determination is made, the server transmits a disconnection signal to the multi functional peripheral to release connection between the server and the multi functional peripheral (S1322). The multi functional peripheral having received the disconnection signal transmits an ACK signal indicating that it has received the connection release request to the server (S1323). When the above ACK signal is received by the server, connection between the multi functional peripheral and the server is released.

Further, user information and various setting information are transmitted or received as information transmitted or received between the multi functional peripheral, server and portable telephone, communication is made by use of SSL in the entire communication. As a result, communication with high secrecy can be attained.

Next, the operation for releasing connection between the portable telephone and the multi functional peripheral is explained.

Figure 47:
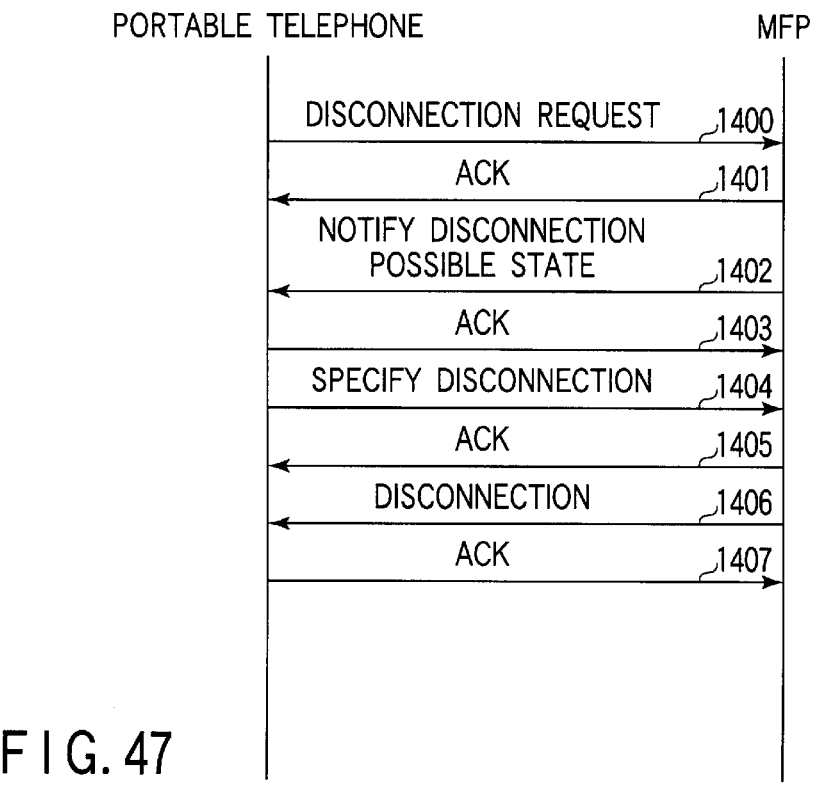
FIG. 47 is an event diagram for illustrating information to be transmitted or received when connection with the multi functional peripheral is released in response to the request from the portable telephone.

First, a case wherein connection between the portable telephone and the multi functional peripheral is released from the portable telephone side is explained. FIG. 47 is an event diagram for illustrating a case wherein release of connection is requested from the portable telephone.

First, the portable telephone transmits a disconnection request signal containing information indicating that release of connection is requested to the multi functional peripheral (S1400). The multi functional peripheral having received the disconnection request signal transmits an ACK signal indicating that it has received the disconnection request signal to the portable telephone (S1401).

The multi functional peripheral having received the disconnection request signal from the portable telephone determines whether connection with the portable telephone can be released or not. If it is determined based on the determination result that connection with the portable telephone can be released, the multi functional peripheral transmits a disconnection possibility notifying signal indicating that the connection release can be effected to the portable telephone (S1402).

The portable telephone having received the disconnection possibility notifying signal transmits an ACK signal indicating that it has received the disconnection possibility notifying signal to the multi functional peripheral (S1403). Further, the portable telephone having received the disconnection possibility notifying signal transmits a disconnection specifying signal for specifying the connection release to the multi functional peripheral (S1404).

The multi functional peripheral having received the disconnection specifying signal transmits an ACK signal indicating that it has received the disconnection specifying signal to the portable telephone (S1405). Further, the multi functional peripheral having received the disconnection specifying signal transmits a disconnection signal for breaking the connection on the multi functional peripheral side to the portable telephone (S1406).

The portable telephone having received the disconnection signal makes preparation for release of the connection. When the preparation for release of the connection is completed, the portable telephone transmits an ACK signal indicating that it has received the disconnection signal to the multi functional peripheral (S1407). The multi functional peripheral having received the ACK signal breaks the connection with the portable telephone and terminates the process.

Figure 48:
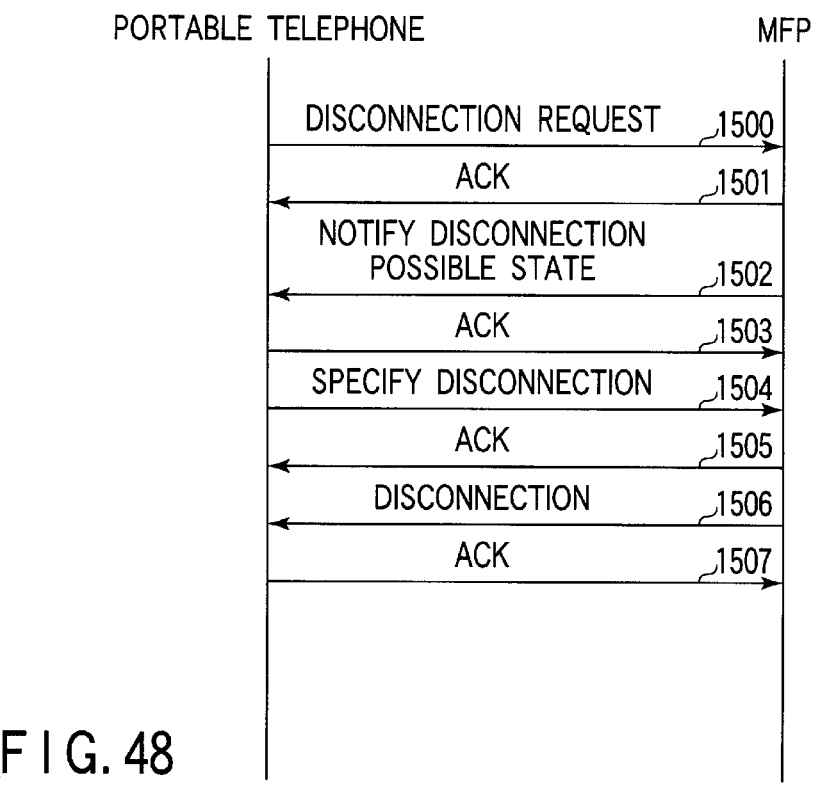
FIG. 48 is an event diagram for illustrating information to be transmitted or received when connection with the portable telephone is released in response to the request from the multi functional peripheral.

Next, a case wherein connection between the portable telephone and the multi functional peripheral is released from the multi functional peripheral side is explained. FIG. 48 is an event diagram for illustrating a case wherein release of connection is requested from the multi functional peripheral.

First, the multi functional peripheral transmits a disconnection request signal containing information indicating that release of connection is requested to the portable telephone (S1500). The portable telephone having received the disconnection request signal transmits an ACK signal indicating that it has received the disconnection request signal to the multi functional peripheral (S1501).

The portable telephone having received the disconnection request signal from the multi functional peripheral determines whether connection with the multi functional peripheral can be released or not. If it is determined based on the determination result that connection with the multi functional peripheral can be released, the portable telephone transmits a disconnection possibility notifying signal indicating that the connection release can be effected to the multi functional peripheral (S1502).

The multi functional peripheral having received the disconnection possibility notifying signal transmits an ACK signal indicating that it has received the disconnection possibility notifying signal to the portable telephone (S1503). The portable telephone having received the ACK signal from the multi functional peripheral transmits a disconnection specifying signal for specifying release of the connection to the multi functional peripheral (S1504). The multi functional peripheral having received the disconnection specifying signal transmits an ACK signal indicating that it has received the disconnection specifying signal to the portable telephone (S1505).

Further, the multi functional peripheral having received the disconnection specifying signal from the portable telephone transmits a disconnection signal for releasing the connection to the portable telephone (S1506).

The portable telephone having received the disconnection signal makes preparation for release of the connection. When the preparation for release of the connection is completed, the portable telephone transmits an ACK signal indicating that it has received the disconnection signal to the multi functional peripheral (S1507). The multi functional peripheral having received the ACK signal breaks the connection with the portable telephone and terminates the process.

As described above, information stored in the server is read out and supplied to the multi functional peripheral by use of individual information which the portable telephone has. In this case, individual authentication can be made by use of individual information which the portable telephone has and information stored in the server can be read out by any one of the multi functional peripherals. As a result, the operability of the multi functional peripheral which can easily and safely utilize a user interface which is so set as to be easily used by the user and have various functions can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising:
   a digital multifunction machine in which various settings can be made; and
   a server,
   wherein said server comprises:
      a first data base for storing setting information for each of users; and
      a second data base for converting the setting information in accordance with types of various digital multifunction machines, and
   wherein said digital multifunction machine comprises:
      a first interface for transmitting/receiving information with respect to a portable device having user information; and
      a control section for acquiring setting information from the portable device, the setting information being obtained by converting setting information, which is stored in the first data base corresponding to the user information of the portable device connected via the first interface, in accordance with the second data base to match the multi function machine, and for making settings by use of the acquired setting information.

2. An image processing system comprising:
   a digital multifunction machine in which various settings can be made; and
   a server,
   wherein said server comprises:
      a first data base for storing setting information for each of users; and
      a second data base for converting the setting information in accordance with types of various digital multifunction machines, and
   wherein said digital multifunction machine comprises:
      a first interface for transmitting/receiving information with respect to a portable device having user information;
      a second interface for transmitting/receiving information with respect to a server having setting information stored therein for each user; and
      a control section for acquiring user information from the portable device via said first interface, acquiring setting information corresponding to the user indicated by the acquired user information from the server via said second interface, the setting information being converted to match the digital multifunction machine in accordance with the second data base, and making settings by use of the acquired setting information.

3. An image processing system according to claim 1, wherein the digital multifunction machine further includes an image reading section configured to convert an original image into image data, and
   said control section converts the image data into image data which the portable device can utilize on the basis of the setting information acquired from the server, and then transmits the image data to the portable device via the first interface.

4. An image processing system according to claim 1, wherein the digital multifunction machine further comprises an image reading section configured to convert an original image into image data, and
   wherein said control section transmits the original image data read by the image reading section to the server via the portable device in response to an instruction for transferring the original image to the server.

5. An image processing system according to claim 1, wherein said portable device has a function of being connected to a network to which a plurality of devices are connected,
   wherein said digital multifunction machine further comprises an image reading section for converting an original image into image data, and
   wherein said control section transmits the image data of the original image read by the image reading section to the devices on the network via the portable device.

6. A setting method for use in an image processing system comprising a digital multifunction machine and a server, said setting method comprising:
   controlling the server to store setting information for each of users corresponding to user information, and data used to convert setting information in accordance with each type of various digital multifunction machines;
   controlling the server to acquire user information from a portable device connected to the digital multifunction machine;
   controlling the server to convert setting information corresponding to user information acquired from the portable device, into setting information that conform with the digital multifunction machine;

controlling the digital multifunction machine to acquire, via the portable device, setting information converted by the server; and controlling the digital multifunction machine to perform a setting using setting information acquired via the portable device.

7. A setting method for use in an image processing system comprising a digital multifunction machine and a server, said setting method comprising:

controlling the server to store setting information for each of users corresponding to user information, and data used to convert setting information in accordance with each type of various digital multifunction machines;

controlling the digital multifunction machine to acquire user information from a portable device;

controlling the digital multifunction device to transmit user information, acquired from the portable device, to the server;

controlling the server to convert setting information corresponding to the user information received from the digital multifunction machine, into setting information that conform with the digital multifunction machine;

controlling the digital multifunction machine to acquire setting information converted at the server; and controlling the digital multifunction machine to perform a setting using setting information acquired from the server.

* * * * *